United States Patent
Ebihara et al.

(10) Patent No.: US 6,924,807 B2
(45) Date of Patent: Aug. 2, 2005

(54) IMAGE PROCESSING APPARATUS AND METHOD

(75) Inventors: Hitoshi Ebihara, Kanagawa (JP); Kazumi Sato, Kanagawa (JP); Masakazu Mokuno, Tokyo (JP); Hideki Hara, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 298 days.

(21) Appl. No.: 09/815,781

(22) Filed: Mar. 23, 2001

(65) Prior Publication Data

US 2002/0030694 A1 Mar. 14, 2002

Related U.S. Application Data

(60) Provisional application No. 60/277,695, filed on Mar. 21, 2001, and provisional application No. 60/277,850, filed on Mar. 22, 2001.

(30) Foreign Application Priority Data

Mar. 23, 2000 (JP) ........................................ 2000-082686
Dec. 26, 2000 (JP) ........................................ 2000-396191

(51) Int. Cl.[7] ............................................. G06F 15/16
(52) U.S. Cl. ..................... 345/503; 345/505; 345/506; 345/534; 345/537; 345/539; 345/545; 345/629
(58) Field of Search ............................... 345/501–505, 345/506, 520, 534, 537, 539, 545, 629, 473, 531

(56) References Cited

U.S. PATENT DOCUMENTS

| | | | |
|---|---|---|---|
| 4,949,280 A | * | 8/1990 | Littlefield .................... 345/505 |
| 5,434,968 A | | 7/1995 | Kunii et al. |
| 5,546,530 A | * | 8/1996 | Grimaud et al. ............ 345/505 |
| 5,557,711 A | | 9/1996 | Malzbender |
| 5,657,478 A | | 8/1997 | Recker et al. |
| 5,727,192 A | | 3/1998 | Baldwin |
| 5,841,444 A | | 11/1998 | Mun et al. |
| 5,969,728 A | | 10/1999 | Dye et al. |
| 6,128,025 A | * | 10/2000 | Bright et al. ................ 345/504 |
| 6,157,393 A | * | 12/2000 | Potter et al. ................ 345/505 |
| 6,157,395 A | * | 12/2000 | Alcorn ........................ 345/506 |
| 6,292,200 B1 | * | 9/2001 | Bowen et al. .............. 345/506 |
| 6,329,996 B1 | * | 12/2001 | Bowen et al. .............. 345/506 |
| 6,411,302 B1 | * | 6/2002 | Chiraz ......................... 345/545 |
| 6,473,086 B1 | * | 10/2002 | Morein et al. .............. 345/505 |
| 6,573,905 B1 | * | 6/2003 | MacInnis et al. ........... 345/629 |
| 6,664,968 B2 | * | 12/2003 | Ono ............................ 345/532 |
| 6,753,878 B1 | * | 6/2004 | Heirich et al. .............. 345/629 |

FOREIGN PATENT DOCUMENTS

| | | |
|---|---|---|
| EP | 0 422 541 A2 | 4/1991 |
| EP | 0 627 700 A2 | 12/1994 |
| WO | WO 00/01154 | 1/2000 |

OTHER PUBLICATIONS

A. Heirich and L. Moll. Scalable Distributed Visualization Using Off–the–Shelf Components. In Proceedings of the 1999 IEEE Symposium on Parallel Visualization and Graphics, pp. 55–60, Oct. 1999.*

(Continued)

*Primary Examiner*—Ulka J. Chauhan
(74) *Attorney, Agent, or Firm*—Lerner, David, Littenberg, Krumholz & Mentlik, LLP

(57) ABSTRACT

An apparatus for processing image data to produce an image for covering an image area of a display includes a plurality of graphics processors, each graphics processor being operable to render the image data into frame image data and to store the frame image data in a respective local frame buffer; a control processor operable to provide instructions to the plurality of graphics processors; and at least one merge unit operable to synchronously receive the frame image data from the respective local frame buffers and to synchronously produce combined frame image data based thereon.

16 Claims, 25 Drawing Sheets

OTHER PUBLICATIONS

S. Molnar, J. Eyles, and J. Poulton. PixelFlow: High–Speed Rendering Using Image Composition. In Proceedings of the 19th Annual Conference on Computer Graphics and Interactive Techniques, vol. 26 issue 2, pp. 231–240, Jul. 1992.*

S. Nishimura and T. Kunii. VC–1: A Scalable Graphics Computer with Virtual Local Frame buffers. In Proceedings of the 23rd Annual Conference on Computer Graphics and Interactive Techniques, pp. 365–373, Aug. 1996.*

B. Wei, D. Clark, E. Felten, K. Li, and G. Stoll. Performance Issues of a Distributed Frame Buffer on a Multicomputer. In Proceedings of the ACM SIGGRAPH/EUROGRAPHICS workshop on Graphics Hardware, pp. 87–96, Aug. 1998.*

\* cited by examiner

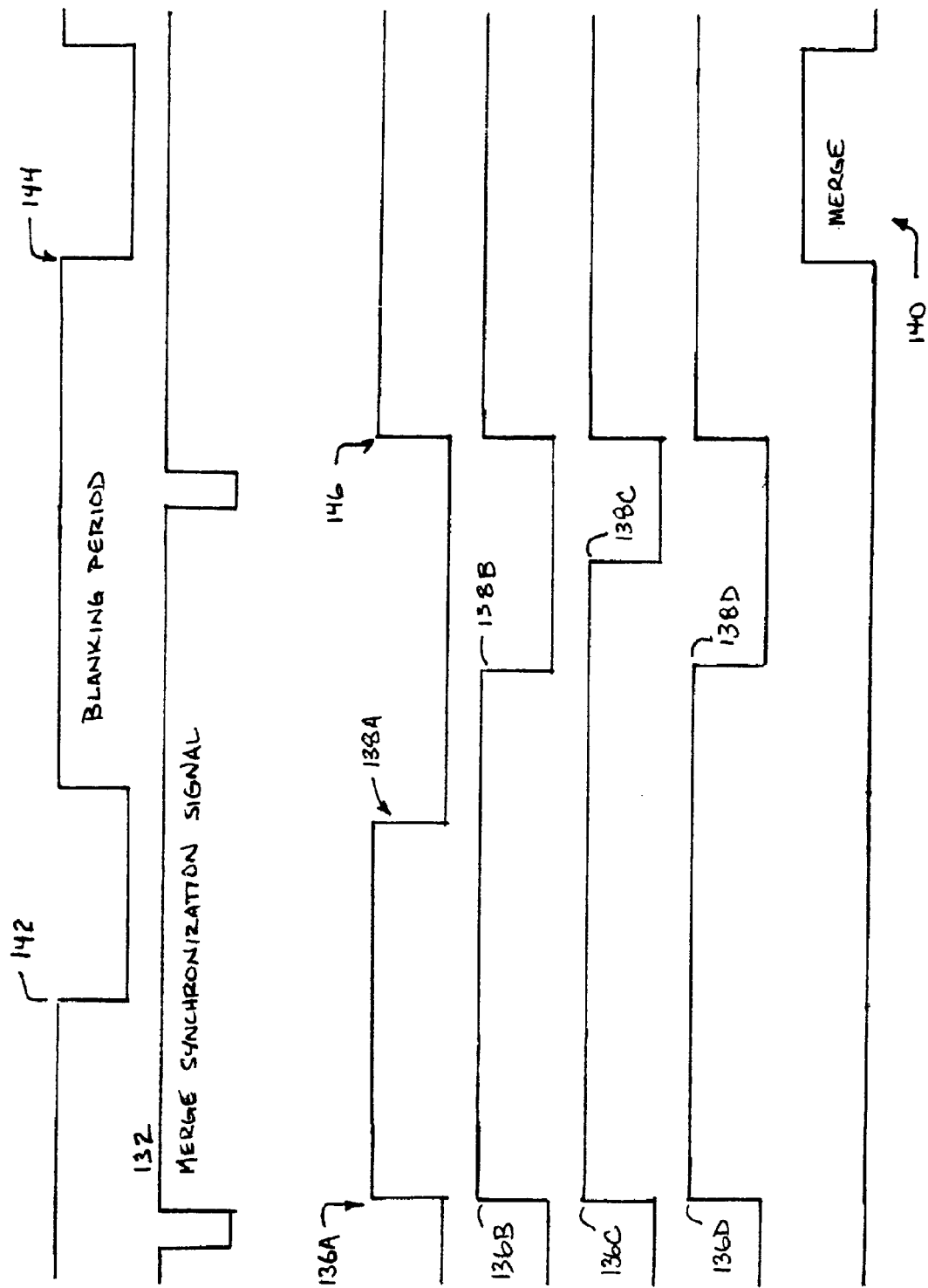

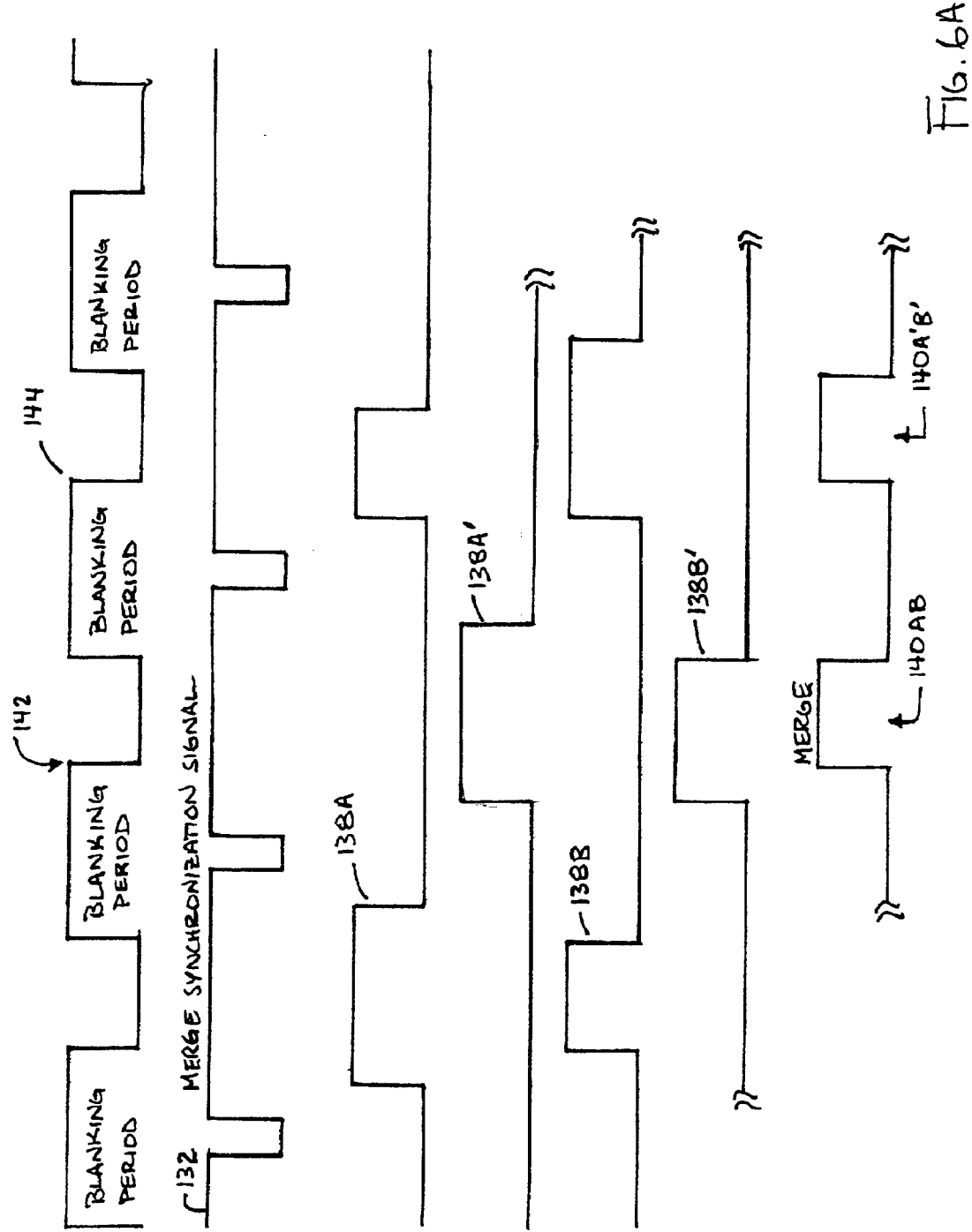

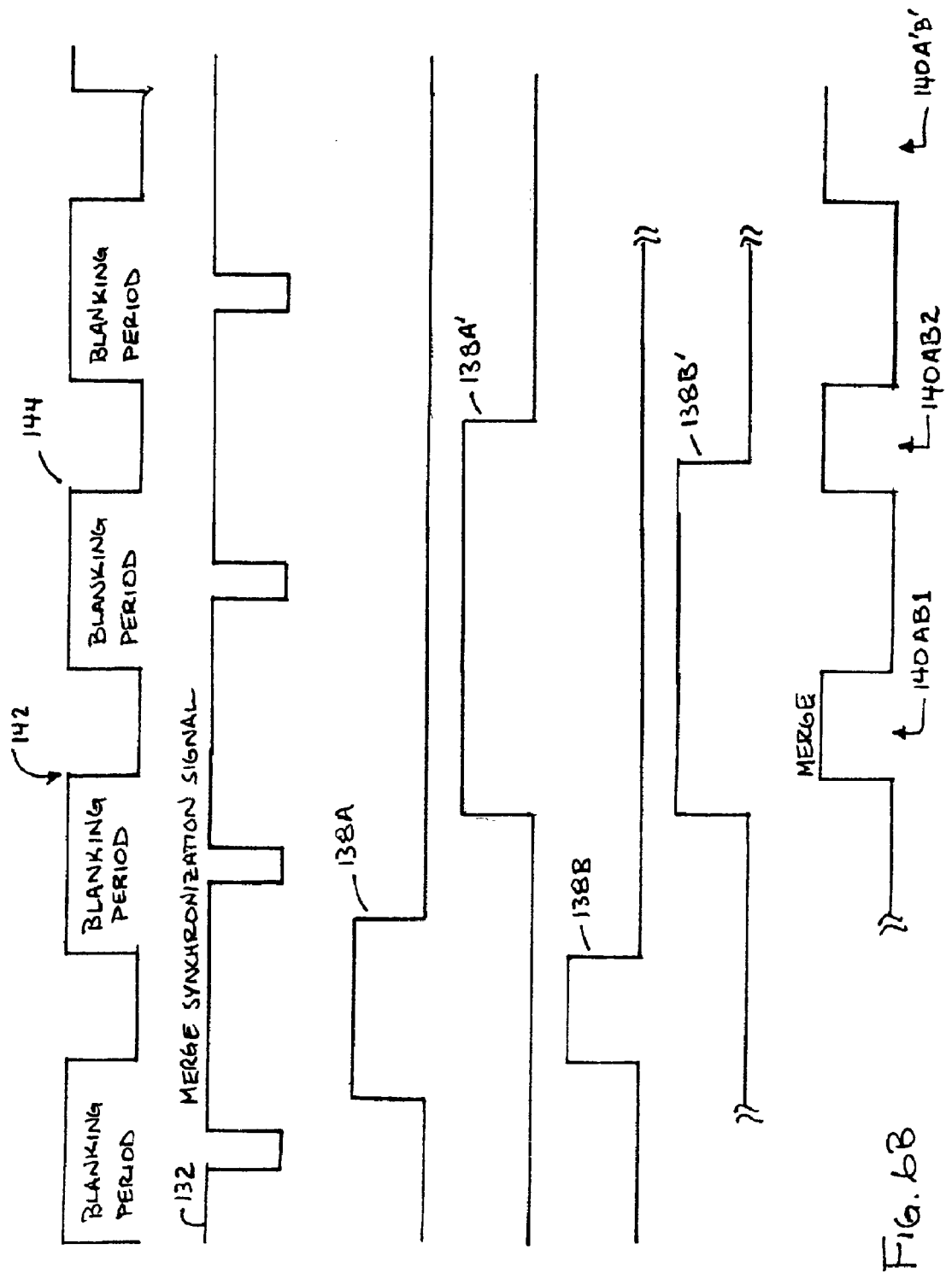

IMAGE PROCESSING APPARATUS AND METHOD

CROSS-REFERENCE TO RELATED APPLICATIONS

This application claims the benefit of U.S. Provisional Patent Application No. 60/277,695, entitled SYSTEM AND METHOD FOR IMAGE PROCESSING, filed Mar. 21, 2001, the entire disclosure of which is hereby incorporated herein by reference. This application further incorporates herein by reference the entire disclosure of U.S. Provisional Patent Application No. 60/277,850, entitled IMAGE PROCESSING APPARATUS, filed Mar. 22, 2001.

BACKGROUND OF THE INVENTION

The present invention relates to an apparatus for processing image data to produce an image for display on a display screen and, more particularly, to produce a high quality image for display on a relatively large display screen.

Moving pictures, such as those produced for display on "the big screen" at cinemas are usually provided by way of 35 mm film that is projected onto a relatively large screen. The use of conventional graphics processors (employing computers, microprocessors, etc.) to produce moving pictures is becoming more popular inasmuch as state of the art graphics processors are becoming more sophisticated and capable of producing quality images. As a practical matter, however, conventional graphics processors are designed to produce moving pictures on a computer display screen (such as a 17-inch monitor), a conventional television screen, etc., and not on relatively large screens, such as those found in cinemas. Indeed, conventional graphics processors are not capable of processing image data at a sufficient speed to produce moving pictures of sufficient quality, particularly when the moving pictures are to be displayed on a relatively large display screen.

The processing limitations of conventional graphics processors affects image quality in two basic ways, namely, the resolution (e.g., the total number of pixels available for each frame of image data) is insufficient for relatively large display screens, and the frame rate (e.g., the number of frames of image data produced each second) is insufficient to meet or exceed the frame rate for the 35 mm film cinematography protocol.

With reference to FIG. 1, a conventional graphics processor 10 may include three basic components, namely, a processing unit or software processor 12, a rendering unit 14, and a frame buffer 16. At its core, the conventional graphics processor 10 receives image data, including data concerning primitives (e.g., polygons used to model one or more objects of the image to be displayed) and produces a series of frames of image data (or pixel data), where each frame of image data contains the information necessary to display one frame of the image on the display screen. When these frames of image data are displayed at a sufficient frame rate, the appearance of movement is achieved.

The software processor 12 manipulates the image data to obtain a sequence of instructions (such as polygon instructions) for input to the rendering unit 14. The rendering unit 14 receives the sequence of instructions and produces pixel data, e.g., pixel position, color, intensity, etc. The pixel data is stored in the frame buffer 16 and an entire frame of the pixel data is referred to herein as frame image data. The frame buffer 16 is usually sized to correspond with the resolution of the display screen such that enough pixel data to cover an entire frame of the display screen may be stored. When a full frame of image data are stored in the frame buffer 16, the frame image data are released from the frame buffer 16 to be displayed on the display screen.

Among the processing bottlenecks caused by the conventional graphics processor 10 of FIG. 1 that affect processing speed is the rate at which the software processor 12 and rendering unit 14 can produce the frame image data. In order to ameliorate this bottleneck, it has been proposed to provide a graphics processor 20 having parallel software processing/rendering units 18 as illustrated in FIG. 2. The output from these parallel processing units 18 are input to a single frame buffer 16 from which the frame image data are released for display on the display screen. Although the graphics processor 20 of FIG. 2 ameliorates one of the processing bottlenecks by increasing the rate at which the image data are processed and rendered, just like peeling back the layers of an onion, an additional processing bottleneck emerges. Indeed, the rate at which the frame image data can be stored into the frame buffer 16 and released therefrom is insufficient to adequately meet the data throughput requirements for producing a high quality moving picture on a relatively large display screen.

Accordingly, there is a need in the art for a new apparatus and/or method for providing graphics processing that significantly increases processing speed such that high resolution moving pictures may be produced for display on a large display screen.

SUMMARY OF THE INVENTION

In accordance with at least one aspect of the present invention, an apparatus for processing imaged data to produce an image for covering an image area of a display includes a plurality of graphics processors, each graphics processor being operable to render the image data into frame image data and to store the frame image data in a respective local frame buffer; a control processor operable to provide instructions to the plurality of graphics processors; and one or more merge units operable to synchronously receive the frame image data from the respective local frame buffers and to synchronously produce combined frame image data based thereon.

Preferably, the plurality of graphics processors are grouped into respective sets of graphics processors; the one or more merge units include a respective local merge unit coupled to each set of graphics processors, and a core merge unit coupled to each local merge unit; the respective local merge units are operable to synchronously receive the frame image data from the respective local frame buffers and to synchronously produce local combined frame image data based thereon; and the core merge unit is operable to synchronously receive the local combined frame image data from the respective local merge units and to synchronously produce the combined frame image data based thereon.

In accordance with at least one further aspect of the present invention, the apparatus preferably includes a video hub operable to receive at least one of a frame of the combined frame image data and at least one externally provided frame of frame image data, the video hub being operatively coupled to the plurality of graphics processors such that (i) at least one of the successive frames of frame image data from one or more of the graphics processors may include at least one of the at least one externally provided frame of frame image data and the frame of the combined frame image data, and (ii) the merge unit is operable to produce a subsequent frame of the combined frame image data based on the at least one of the at least one externally provided frame of frame image data and the frame of the combined frame image data.

Preferably, the apparatus includes a memory hub operable to receive and store common image data, the memory hub being operatively coupled to the plurality of graphics processors such that (i) at least one of the successive frames of frame image data from one or more of the graphics processors may include at least some of the common image data, and (ii) the merge unit is operable to produce a frame of the combined frame image data based on the common image data.

In accordance with at least one further aspect of the present invention, the core merge unit and the respective local merge units are operatively coupled to the control processor by way of separate control data lines such that exclusive communication between the control processor, the core merge unit, and the respective local merge units at least concerning the instruction to operate in the one or more modes is obtained.

In accordance with at least one further aspect of the present invention, an apparatus for processing image data to produce an image for display on a display screen, includes a plurality of graphics processors, each graphics processor being operable to render the image data into frame image data and to store the frame image data in a respective local frame buffer, and each graphics processor including a synchronization counter operable to produce a local synchronization count indicating when the frame image data should be released from the local frame buffer; a control processor operable to provide instructions to the plurality of graphics processors; and at least one merge unit operable to synchronously receive the frame image data from the respective local frame buffers and to synchronously produce combined frame image data based thereon.

In accordance with at least one further aspect of the present invention, the apparatus includes a data bus operatively coupled to the control processor and respective sets of the graphics processors; a respective local merge unit coupled to each set of the graphics processors and operable to synchronously receive the frame image data from the respective local frame buffers and to synchronously produce local combined frame image data based thereon; a core merge unit coupled to each local merge unit and operable to synchronously receive the local combined frame image data from the respective local merge units and to synchronously produce the combined frame image data based thereon; a control data bus operatively coupled to the core merge unit and the local merge units; a bus controller operatively coupled between the data bus and the control data bus and operable to transmit and receive data over the data bus and the control data bus on a priority basis.

Preferably, the core merge unit transmits the merge synchronization signal to the respective graphics processors by way of the bus controller and the data bus. Further, it is preferred that the control processor communicates at least the instructions concerning the one or more modes of operation to the respective local merge units unit by way of the bus controller and the control data bus.

In accordance with at least one further aspect of the present invention, the respective local frame buffers of the respective groups of graphics processors are operatively coupled to the respective local merge units by way of separate data lines such that exclusive transmission of the frame image data from the respective local frame buffers to the respective local merge units is obtained; and the respective local merge units are operatively coupled to the core merge unit by way of separate data lines such that exclusive transmission of the local combined frame image data from the respective local merge units to the core merge unit is obtained.

In accordance with at least one further aspect of the present invention, the apparatus includes a packet switch operatively coupled to the control processor and respective sets of the graphics processors; a respective local merge unit coupled to each set of the graphics processors and operable to synchronously receive the frame image data from the respective local frame buffers and to synchronously produce local combined frame image data based thereon; a core merge unit coupled to each local merge unit and operable to synchronously receive the local combined frame image data from the respective local merge units and to synchronously produce the combined frame image data based thereon; a control data bus operatively coupled to the core merge unit and the local merge units; a packet switch controller operatively coupled between the packet switch and the control data bus and operable to transmit and receive data over the packet switch and the control data bus on a priority basis.

Preferably, the control processor communicates at least the instructions concerning the one or more modes of operation to the respective local merge units and the core merge unit by way of packet switch, the packet switch controller and the control data bus. Further, it is preferred that the core merge unit transmits the merge synchronization signal to the respective graphics processors by way of the packet switch controller, and the packet switch.

In accordance with at least one further aspect of the present invention, an apparatus for processing image data to produce an image for display is formed of a subset of a plurality of processing nodes coupled together on a packet-switched network. The apparatus preferably includes: at least one accelerator node including a plurality of sets of graphics processors, each graphics processor being operable to render the image data into frame image data and to store the frame image data in a respective local frame buffer; one or more merge nodes including one or more merge units, the one or more merge units including one or more local merge units and a core merge unit, a respective one of the local merge units being associated with each set of graphics processors and being operable to synchronously receive the frame image data from the respective local frame buffers and to synchronously produce local combined frame image data based thereon, and the core merge unit being associated with each local merge unit and being operable to synchronously receive the local combined frame image data from the respective local merge units and to synchronously produce the combined frame image data based thereon; at least one configuration node operable to facilitate selecting the subset of processing nodes; a control node including a control processor operable to provide instructions to the subset of processing nodes over the packet-switched network, and operable to select the subset of processing nodes to participate in processing the image data to produce the image for display; and at least one packet switch node operable route data packets between the subset of nodes, the data packets forming at least the image data, frame image data, and combined frame image data.

In accordance with at least one further aspect of the invention, the control node is an (n)th level control node, the at least one merge node is an (n)th level merge node, the packet switch node is an (n)th level packet switch node, and at least one accelerator node is an (n)th level accelerator node that includes an (n−1)th level control node and a plurality of (n−1)th level accelerator nodes coupled together by way of an (n−1)th level packet switch node over the packet-switched network.

In accordance with at least one further aspect of the present invention, a method for processing image data to produce an image for covering an image area of a display, includes: rendering the image data into frame image data using a plurality of graphics processors; storing the frame image data in respective local frame buffers; and synchronously merging the frame image data from the respective local frame buffers to synchronously produce combined frame image data based thereon.

In accordance with at least one further aspect of the present invention, a method for processing image data to produce an image for display on a display screen, includes: rendering the image data into frame image data using a plurality of graphics processors; storing the frame image data in respective local frame buffers; producing respective local synchronization counts indicating when the frame image data should be released from the respective local frame buffers; and synchronously producing combined frame image data from the frame image data.

In accordance with at least one further aspect of the present invention, a method for processing image data to produce an image for display is carried out using a subset of a plurality of processing nodes coupled together on a packet-switched network. Preferably, the method includes: selecting from among the plurality of processing nodes at least one accelerator node including a plurality of sets of graphics processors, each graphics processor being operable to render the image data into frame image data and to store the frame image data in a respective local frame buffer; selecting from among the plurality of processing nodes one or more merge nodes including one or more merge units, the one or more merge units including one or more local merge units and a core merge unit, a respective one of the local merge units being associated with each set of graphics processors and being operable to synchronously receive the frame image data from the respective local frame buffers and to synchronously produce local combined frame image data based thereon, and the core merge unit being associated with each local merge unit and being operable to synchronously receive the local combined frame image data from the respective local merge units and to synchronously produce the combined frame image data based thereon; establishing a control node including a control processor operable to provide instructions to the subset of processing nodes over the packet-switched network, and operable to select the subset of processing nodes to participate in processing the image data to produce the image for display; and employing at least one packet switch node operable route data packets between the subset of nodes, the data packets forming at least the image data, frame image data, and combined frame image data.

Other features, aspects, and advantages of the present invention will become apparent to one skilled in the art from the disclosure herein when taken in conjunction with the accompanying drawings.

BRIEF DESCRIPTION OF THE DRAWINGS

For the purpose of illustrating the various aspects of the invention, there are shown in the drawings forms which are presently preferred, it being understood, however, that the invention is not limited to the precise arrangements and instrumentalities shown.

FIG. 5 is a timing graph illustrating one or more further aspects of the invention consistent with the apparatus of FIG. 3;

FIGS. 6A–B are timing graphs illustrating one or more still further aspects of the invention consistent with the apparatus of FIG. 3;

DETAILED DESCRIPTION OF THE INVENTION

Figure 1:
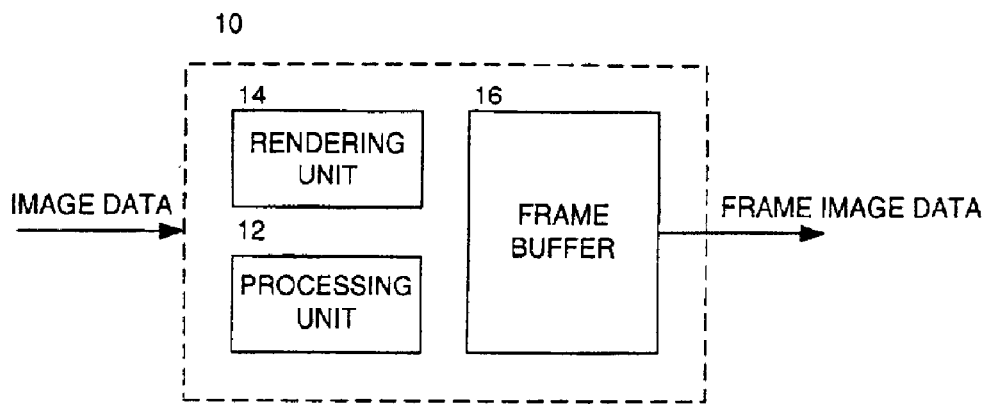
FIG. 1 is a block diagram of a graphics processor in accordance with the prior art.
Figure 2:
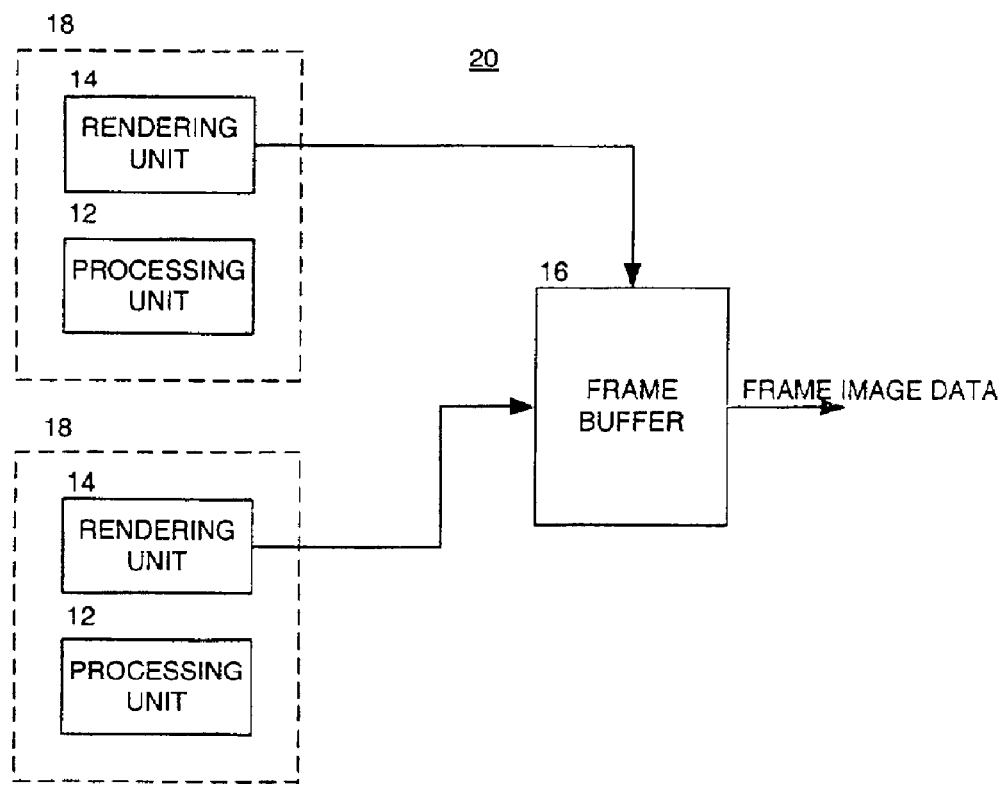
FIG. 2 is a block diagram of an alternative graphics processor in accordance with the prior art.
Figure 3:
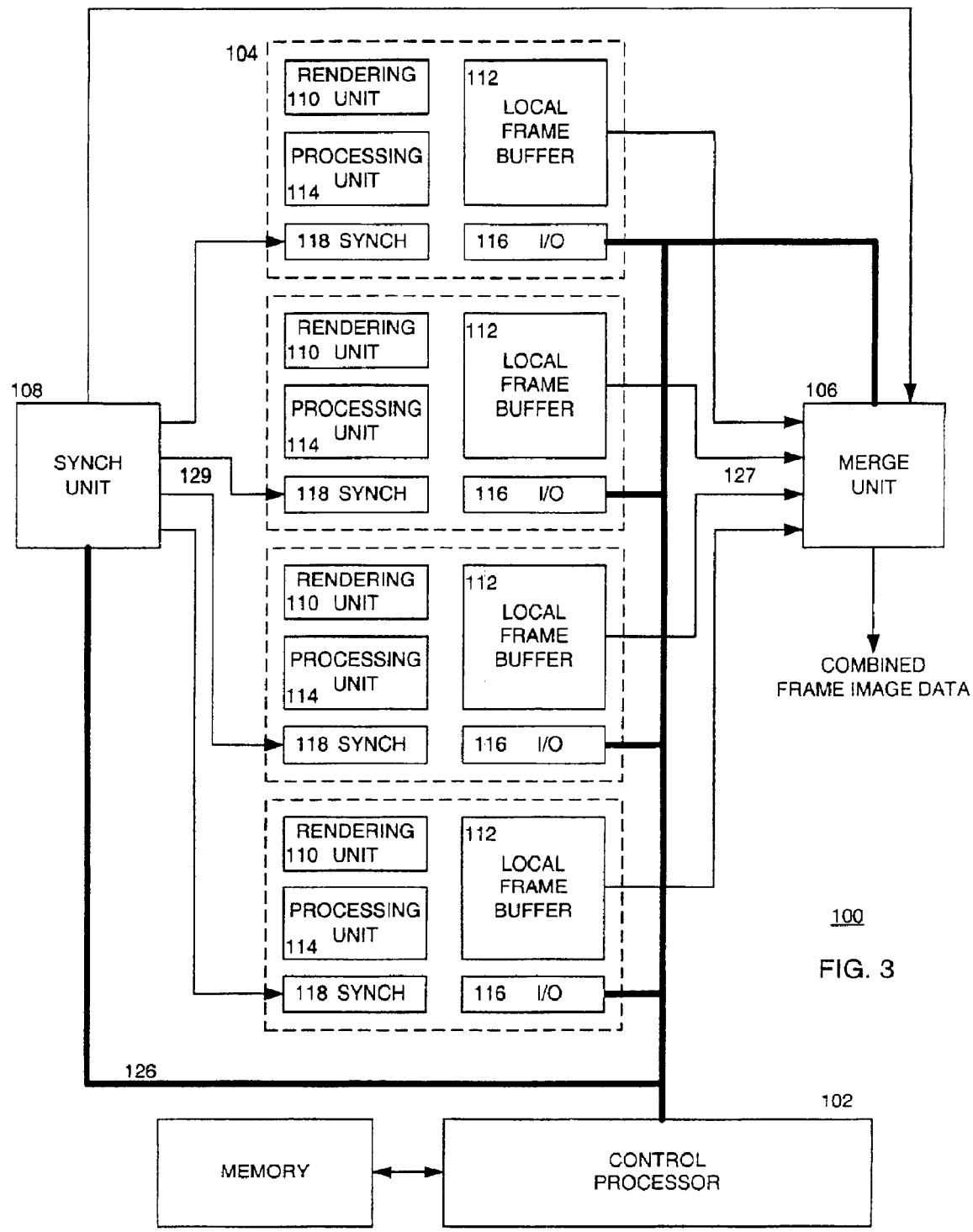
FIG. 3 is a block diagram illustrating an apparatus for processing image data in accordance with one or more aspects of the present invention.

Referring to FIG. 3, there is shown a block diagram of an apparatus 100 for processing image data for producing an image for display on a display screen (not shown). It is noted that the image data may be obtained from a memory of the apparatus 100 or from a secondary memory, such as a hard-disk drive, CD-ROM, DVD-ROM, a memory associated with a communications network, etc. The image data may represent object models, such as 3D and/or 2D polygonal models of objects used in the image to be displayed. Alternatively, the image data may represent sequences of polygonal image instructions produced in accordance with a software program running on a suitable processor.

The apparatus 100 preferably includes a control processor 102 (and associated memory), a plurality of graphics processors 104, at least one merge unit 106, and a synchronization unit 108. The control processor 102 preferably communicates with the plurality of graphics processors 104, the merge unit 106, and the synchronization unit 108 by way of bus 126. In accordance with at least one aspect of the present invention, separate data lines 127 couple each of the graphics processors 104 to the merge unit 106 such that exclusive communication between the respective graphics processors 104 and the merge unit 106 is obtained. Further, separate synchronization lines 129 preferably couple the synchronization unit 108 to each of the graphics processors 104 and the merge unit 106 such that exclusive communication therebetween is obtained.

At least some, and preferably each, of the graphics processors 104 is operable to render image data into frame image data (e.g., pixel data) and to store the frame image data in a respective local frame buffer 112. More particularly, at least some of the graphics processors 104 preferably include a rendering unit 110 for performing the rendering function and a local frame buffer 112 for at least temporarily storing the frame image data. In addition, it is preferred that each graphics processor 104 include a processing unit 114 operable to facilitate performing various processes on the image data, such as polygonal spatial transformation (e.g., translation, rotation, scaling, etc.); 3D to 2D transformation (e.g., perspective view transformation, etc.); and generating sequence instructions (e.g., polygon instructions). The graphics processors 104 preferably also each include an input/output interface 116 suitable for facilitating communication over the bus 126. The graphics processors 104 may each include an optional local synchronization circuit 118, which will be discussed in more detail hereinbelow.

It is understood that the functional blocks illustrated in FIG. 3 are partitioned in a preferred fashion, although it is contemplated that the functional blocks may be partitioned in any other of a plurality of ways without departing from the spirit and scope of the invention as claimed.

The merge unit 106 is preferably operable to synchronously receive frame image data from each of the respective local frame buffers 112 and to synchronously produce combined frame image data based thereon. Preferably, the frame image data are synchronously received by the merge unit 106 in response to a merge synchronization signal produced by one of the merge unit 106 and the synchronization unit 108 and received by the graphics processors 104 over synchronization lines 129. Indeed, the plurality of graphics processors 104 preferably synchronously release the frame image data from the respective local frame buffers 112 to the merge unit 106 in response to the merge synchronization signal.

Preferably, the merge synchronization signal is synchronized in accordance with a display protocol (or standard) defining how respective frames of the combined frame image data are to be displayed. These display protocols may include the well known NTSC protocol, the HDTV protocol, the 35 mm movie protocol, the PAL protocol, etc. The display protocol defines, among other things, the frame rate at which successive frames of the combined image data are to be displayed, and a blanking period, defining when the frames of the combined frame image data are to be refreshed. For example, the blanking period may dictate how long a given frame of the combined frame image data should dwell on the display prior to refresh (as is the case with the NTSC protocol). Alternatively, the blanking period may dictate when a given frame of the combined frame image data should be removed from the display prior to refresh (as is the case with the 35 mm movie protocol).

By way of further example, when the display screen is a conventional CRT, the display protocol may be the NTSC protocol and the blanking periods may be vertical blanking periods. The NTSC protocol provides that the vertical blanking periods occur on a periodic basis consistent with when a scanning beam of the CRT is de-energized and returned to an upper left-hand portion of the display screen. When the invention is used in the NTSC context, the combined frame image data from the merge unit 106 are preferably ready for display just prior to the end of each vertical blanking period of the CRT display screen.

Although the above example relates to the use of CRT display screens, it is understood that the phrase "blanking period" may be applied in a broader sense, such as representing the blanking periods utilized in cinematography (e.g., 35 mm moving images), or other display protocols.

Advantageously, producing the combined frame image data from the merge unit 106 in synchronous fashion with the blanking period of desired display protocols permits the integration of frame image data from different display protocols and/or from different sources of the frame image data. For example, frame image data from the 35 mm film display protocol may be combined with frame image data produced by way of computer graphics. In a broad sense, therefore, the merge synchronization signal is either derived from or sets a desired frame rate at which the combined frame image data are provided. When the combined frame image data are to be displayed on a CRT display screen, the merge synchronization signal is preferably synchronized with the vertical blanking period (or frame rate) of a CRT display screen. Alternatively, when the combined frame image data are to be merged with or utilized to produce a moving image consistent with a 35 mm film cinematography, the merge synchronization signal is preferably synchronized with the frame rate (or blanking period) consistent with that protocol.

Figure 4:
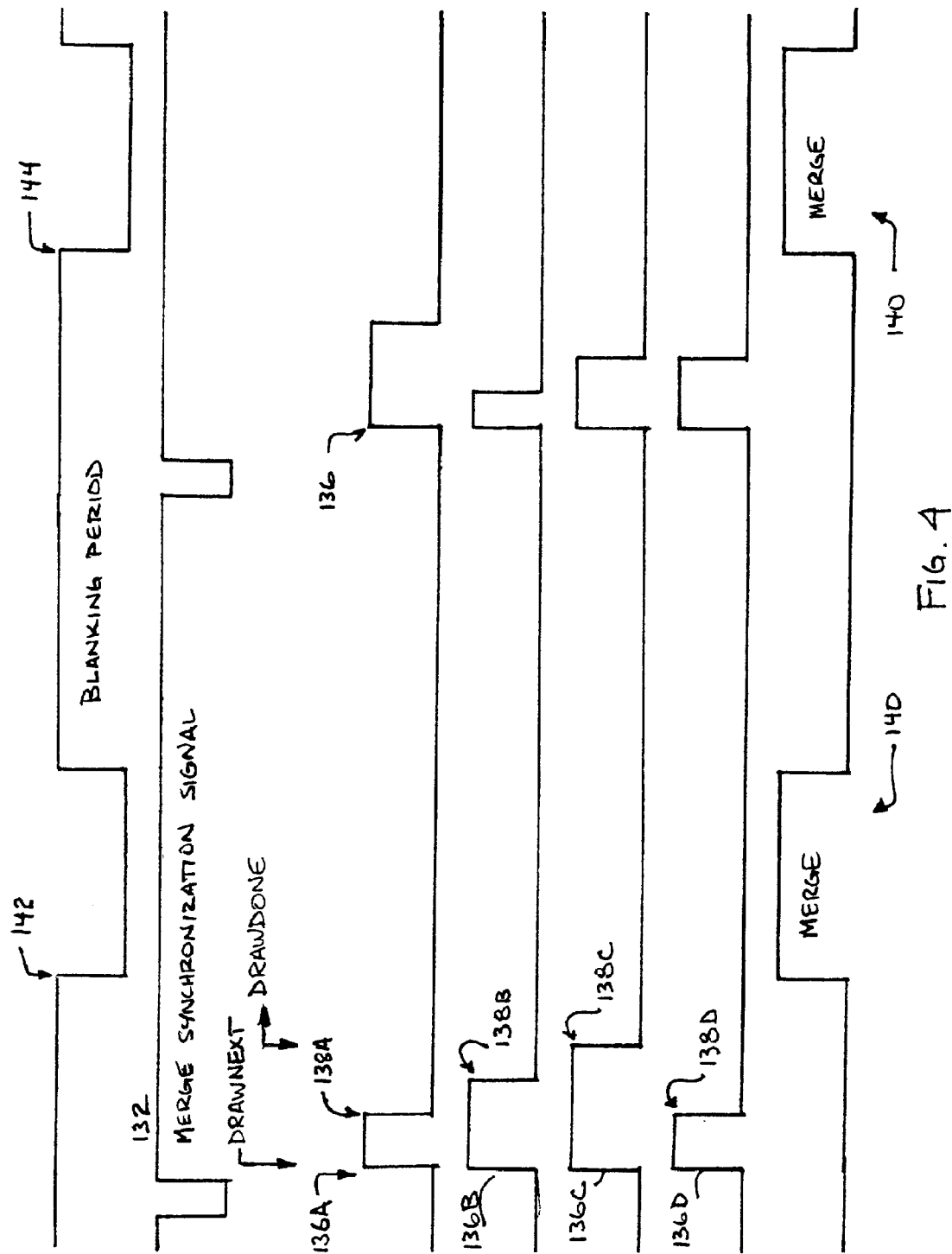
FIG. 4 is a timing graph illustrating one or more aspects of the invention consistent with the apparatus of FIG. 3.

Reference is now made to FIG. 4, which is a timing diagram that illustrates the relationship between the operation of the apparatus 100 of FIG. 3 and certain aspects of a display protocol. For example the relationship between the blanking period, the merge synchronization signal, the rendering period, and the merge period is shown. As illustrated at the top timing waveform, a frame includes an interval during which an image frame is to be displayed or refreshed (indicated by a low logic state) and a period during which an image frame is to be made ready for display, e.g., the blanking period (indicated by a high logic state).

In accordance with at least one aspect of the present invention, the merge synchronization signal 132 includes transitions, such as one of rising and falling edges, that are proximate to the ends 142, 144 of the blanking periods (i.e., the transitions from high logic levels to low logic levels). For example, the merge synchronization signal 132 may include transitions that lead the ends 142, 144 of the blanking periods. Alternatively, the merge synchronization signal 132 may include transitions that are substantially coincident with the ends 142, 144 of the blanking periods. In any case, the merge synchronization signal 132 is preferably synchronized with the frame rate dictated by the display protocol such that the merge unit 106 initiates the production of, or releases, the combined frame image data for display at the end of at least one of the blanking periods.

In order for the local frame buffers 112 to be ready to release the combined frame image data for display at the ends 142, 144 of the blanking periods, at least some of the graphics processors 104 preferably initiate rendering the image data into the frame buffers 112 prior to the ends 142, 144 of the blanking periods, such as at 136A–D. As shown, four rendering processes are initiated at respective times 136A–D, although any number of rendering processes may be employed using any number of graphics processors 104 without departing from the scope of the invention. Further, the rendering processes in each of the graphics processors 104 may be initiated at the same time or may be initiated at different times. In accordance with at least one aspect of the present invention, the rendering units 110 of the graphics processors 104 are preferably operable to begin rendering the image data into the respective frame buffers 112 asynchronously with respect to the merge synchronization signal 132. For example, the control processor 102 may issue a "begin rendering" command (or trigger) to the graphics processors 104, where the begin rendering command is asynchronous with respect to the merge synchronization signal 132. The begin rendering command may be given any suitable name, such as DRAWNEXT. It is also contemplated that the processing units 114 may initiate rendering as a result of software program execution without specific triggering from the control processor 102. Each (or a group) of the graphics processors 104 may complete the rendering process of the image data into the respective frame buffers 112 at any time (e.g., at 138A–D). It is preferred that at least one of the graphics processors 104 is operable to issue a rendering complete signal to the control processor 102 when it has completed rendering a frame of the frame image data. The rendering complete command may be given any suitable name, such as DRAWDONE.

In response to the merge synchronization signal 132, the respective graphics processors 104 preferably release the frame image data from the respective local frame buffers 112 to the merge unit 106 such that the merge unit 106 may synchronously produce the combined frame image data therefrom. The combined frame image data are preferably produced by the merge unit 106 during the interval between the end of one blanking period and the beginning of the next blanking period as shown by the logic transitions labeled 140.

With reference to FIGS. 3 and 4, one or more of the graphics processors 104 preferably include a respective local synchronization circuit 118 operable to receive the merge synchronization signal 132 over synchronization lines 129 from the synchronization unit 108 or from the merge unit 106. The respective local synchronization units 118 are preferably further operable to deliver the synchronization signal to the various portions of the graphics processors 104 to enable them to synchronously release the respective frame image data from the local frame buffers 112 to the merge unit 106. The local synchronization circuits 118 preferably employ counters to count between respective transitions of the merge synchronization signal 132.

In accordance with one or more further aspects of the present invention, the control processor 102 is preferably operable to instruct the respective graphics processors 104 and the merge unit 106 to operate in one or more modes that affect at least one of (i) timing relationships between when image data are rendered, when frame image data are released from respective local frame buffers 112, and when the frame image data are merged; and (ii) how the frame image data are merged to synchronously produce the combined frame image data. As discussed above with respect to FIG. 4, one of these modes provides that at least some of the graphics processors complete rendering the image data into the respective frame buffers 112 prior to the end of each blanking period.

Another of these modes preferably provides that one of more of the graphics processors 104 completes rendering the image data into the respective frame buffers 112 prior to the end of an integral number of blanking periods. This mode is illustrated in FIG. 5, which is a timing diagram showing the relationship between the frame rate, the blanking period, the merge synchronization signal 132, the rendering period, and the merge period carried out by the apparatus 100 of FIG. 3. The plurality of graphics processors 104 may initiate the rendering of the image data into the respective local frame buffers 112 (e.g., at 136) either synchronously, asynchronously, in response to a begin rendering command (DRAWNEXT) from the control processor 102 or processing units 114, etc., it being most preferred that at least a group of the graphics processors 104 initiate rendering at substantially the same time and at some point during a blanking period. Each of the graphics processors 104 may complete the rendering process at different times, such as at 138A-D.

According to this mode of operation, however, the rendering processes need not be completed prior to the termination of each blanking period; rather, they may be completed prior to the termination of an integral number of blanking periods (such as two blanking periods as shown). Although at least some of the graphics processors 104 may not complete a given rendering process prior to the end 142 of a first blanking period, they may complete the rendering process prior to the end 144 of a second blanking period. Advantageously, in this mode of operation, each of the graphics processors 104 enjoys the benefit of additional time during which to render the image data into the respective local frame buffers 112. In response to the merge synchronization signal 132, the respective graphics processors 104 preferably release the frame image data from the respective local frame buffers 112 to the merge unit 106 at the end of every second blanking period (such as at 144). New image data may be rendered into the local frame buffers 112 beginning at, for example, 146. Although in the example illustrated in FIG. 5, the integral number of blanking periods is two, any integral number may be employed in this mode of operation without departing from the scope of the invention.

In accordance with yet another mode of operation of the invention, and with reference to FIG. 6A, one or more of the graphics processors 104 may each include an integral number of local frame buffers 112 (e.g., two local frame buffers used in so-called "double buffering"). In a given frame of the display protocol, only one of the integral number of local frame buffers 112 of a given graphics processor 104 need contain a full frame of frame image data and, therefore, that graphics processor 104 need only complete rendering the image data into the respective integral number of local frame buffers 112 prior to the end of a corresponding integral number of blanking periods. For example, a first graphics processor 104 may include two local frame buffers 112A, 112A' and a second graphics processor 104 may include two more local frame buffers 112B, 112B'. In accordance with this mode of operation, the first graphics processor 104 should complete rendering the image data into local frame buffer 112A prior to the end 142 of a first blanking period (e.g., at 138A) and preferably before a next trigger to begin rendering is received. It is noted that the first graphics processor 104 need not complete rendering the image data into local frame buffer 112A' until prior to the end 144 of a second blanking period (e.g., at 138A') and preferably before yet another trigger to begin rendering is received. Indeed, the first graphics processor 104 need not even begin rendering the image data into local frame buffer 112A' until after the image data are rendered into the first local frame buffer 112A.

Similarly, the second graphics processor 104 should complete rendering the image data into local frame buffer 112B prior to the end 142 of the first blanking period (e.g., at 138B), while the second graphics processor 104 need not complete rendering the image data into local frame buffer 112B' until prior to the end 144 of the second blanking period (e.g., at 138B'). As frame image data are available for release from the local frame buffer 112A and the local frame buffer 112B prior to the end 142 of the first blanking period, such frame image data are preferably released in response to the merge synchronization signal 132 to the merge unit 106 as shown in FIG. 6A at 140AB. As frame image data are available in each of local frame buffer 112A' and local frame buffer 112B' prior to the end 144 of the second blanking period, such frame image data are preferably released in response to the merge synchronization signal 132 to the merge unit 106 as shown at 140A'B'.

With reference to FIG. 6B, an error condition could occur if one or both of the first and second graphics processors 104 fail to complete rendering into one or both of the local frame buffers 112A', 112B', respectively, prior to 144. In this case, release of the frame image data from local frame buffer 112A' (and/or 112B') to the merge unit 106 is not permitted (i.e., just after 144) and the contents of local frame buffers 112A and 112B are re-released to the merge unit 106 (at 140AB2). When the first graphic processor 104 completes rendering into the respective local frame buffers 112A', 112B', the frame image data therein may be released at the end of the next blanking period, e.g., at 140A'B'. This advantageously minimizes the effects of the error condition.

Although in the above examples only two graphics processors 104 each containing two local frame buffers 112 have been discussed, the invention contemplates any number of graphics processors 104 each containing any number of local frame buffers 112. It is noted that this mode may also apply to a group of graphics processors 104 each containing only one local frame buffer 112. In this case, each graphics processor 104 would enjoy a time period during which rendering could be performed that corresponds to the number of graphics processors 104 (or local frame buffers 112) participating in the mode of operation. Each graphics processor 104 would complete rendering into a given local frame buffer 112 prior to the end of an integral number of blanking periods that corresponds with the integral number of graphics processors 104 (or local frame buffers 112) participating in the mode of operation. For example, when four graphics processors 104 participate in the mode of operation and each graphics processor 104 includes a single local frame buffer 112, each graphics processor 104 could enjoy a time period during which rendering may be performed that corresponds to four frames of the display protocol.

Figure 7A:
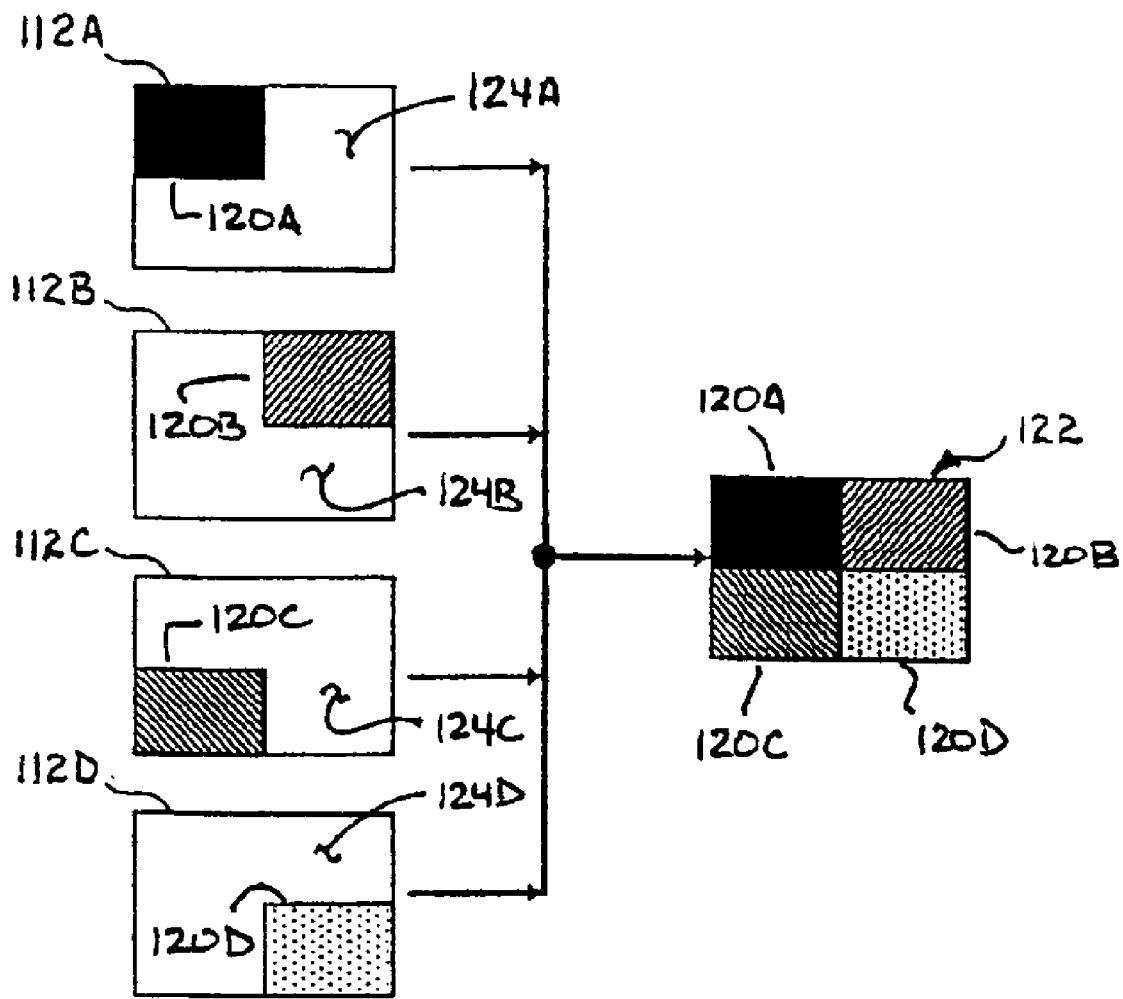
FIGS. 7A–7E are illustrative examples of various modes of operation consistent with one or more aspects of the present invention suitable for implementation using the apparatus for processing image data of FIG. 3.

With reference to FIGS. 7A–E, the modes of operation in accordance with one or more aspects of the present invention preferably include at least one of area division, averaging, layer blending, Z-sorting and layer blending, and flip animation. With reference to FIG. 7A, the area division mode of operation preferably provides that at least two of the local frame buffers 112 (as shown, four local frame buffers 112A–D are contemplated) are partitioned into respective rendering areas 120A–D that correspond with respective areas of the display screen that will be covered by the combined frame image data 122, and non-rendering areas 124A–D that are not utilized to carry frame image data. In accordance with the area division mode, an aggregate of the rendering areas 120A–D results in a total rendering area that corresponds with a total area of the display screen that will be covered by the combined frame image data 122. In this mode, the merge unit 106 is preferably operable to synchronously aggregate the respective frame image data from the respective rendering areas 120A–C of the graphics processors 104 based on the known alpha blending technique to produce the combined frame image data. The local frame buffers 112A–D may be employed by separate graphics processors 104 or may be employed by, and distributed among, a lesser number of graphics processors 104. The area division mode of operation may take advantage of one or more of the timing relationships discussed hereinabove with respect to FIGS. 4, 5 and 6A, it being preferred that the one or more graphics processors 104 complete rendering the image data into the respective rendering areas 120A–D of the local frame buffers 112A–D prior to the end of each blanking period (for example, see FIG. 4).

Figure 7B:
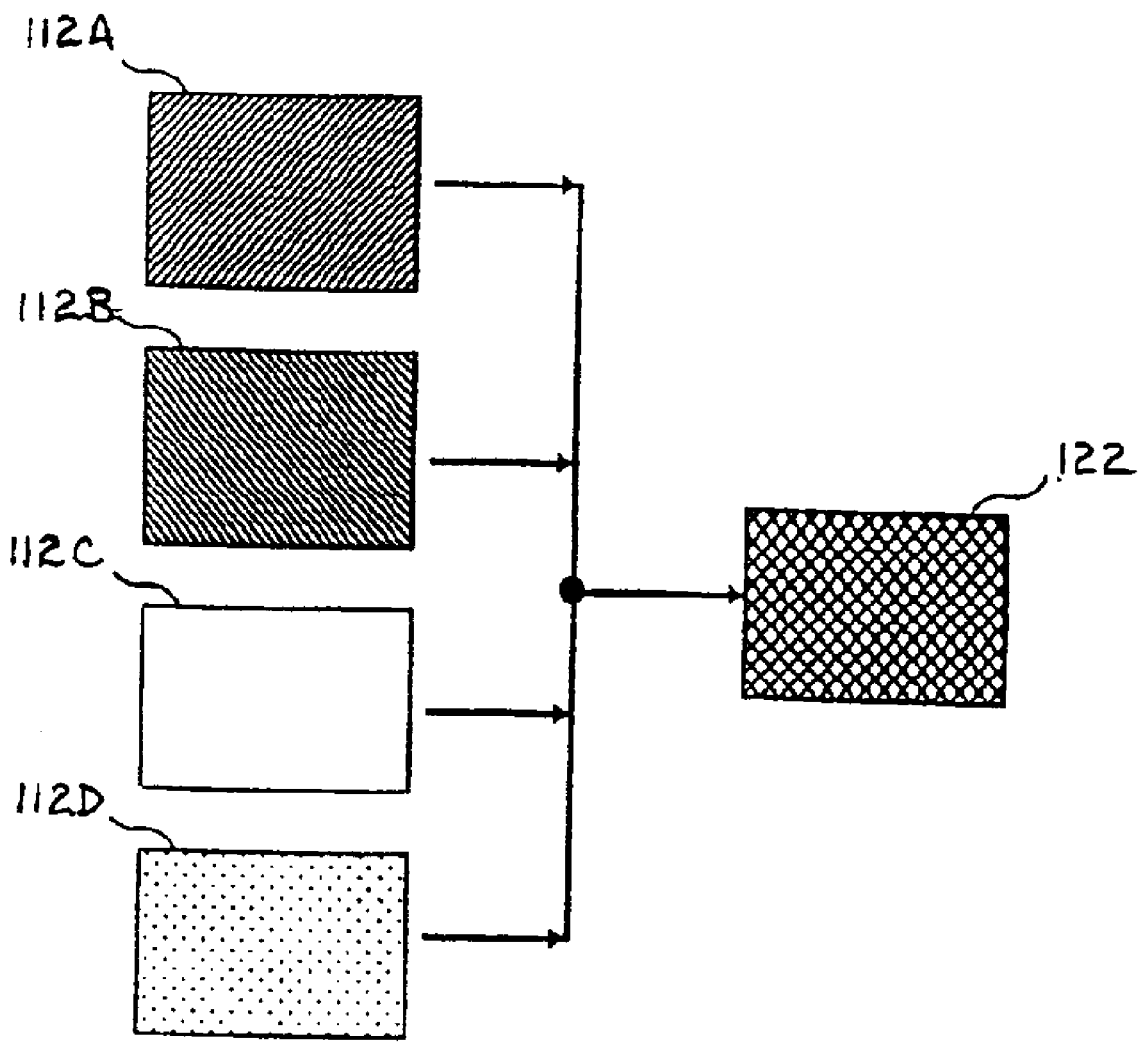
Figure 7C:
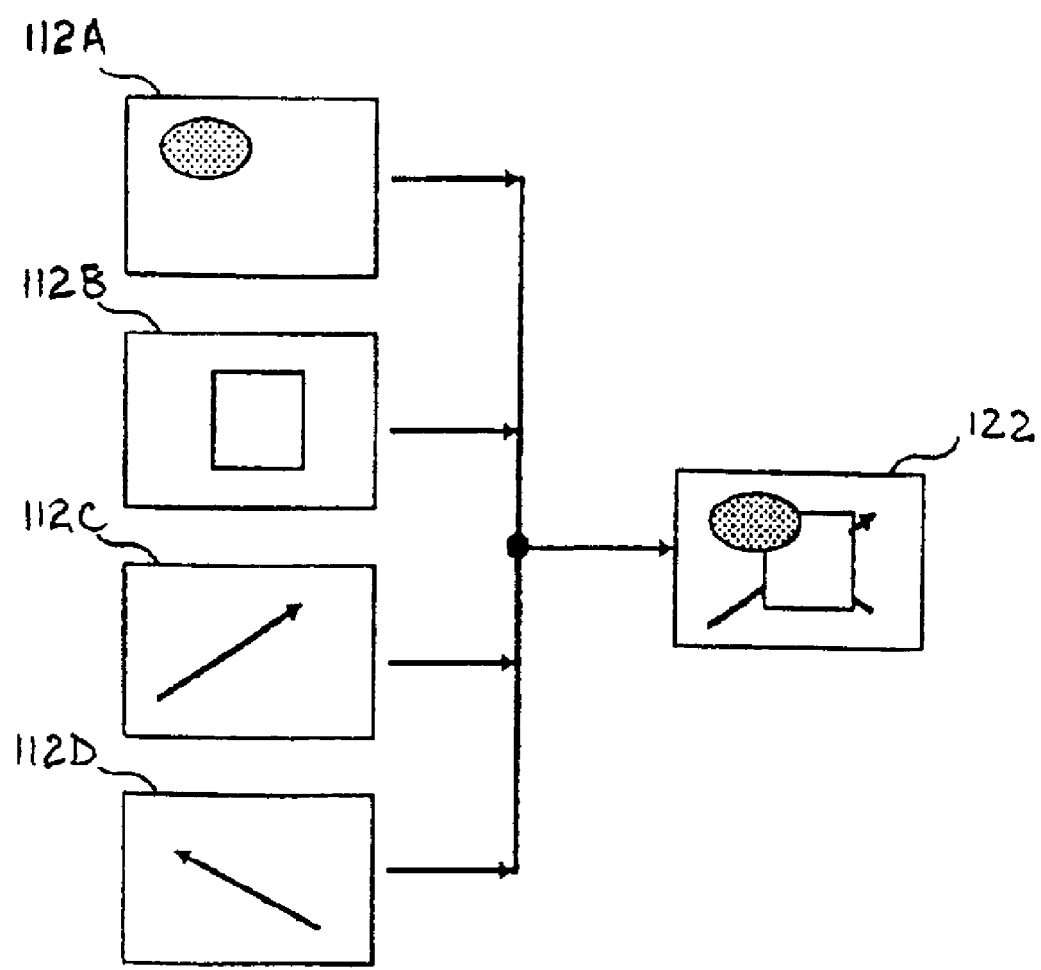

With reference to FIG. 7B, the averaging mode of operation preferably provides that the local frame buffers 112 of at least two of the graphics processors 104 (as shown, four local frame buffers 112A–D are contemplated) include rendering areas 120A–D that each correspond with the total area covered by the combined frame image data 122. The averaging mode further provides that the merge unit 106 averages the respective frame image data from the local frame buffers 112 to produce the combined frame image data for display. The averaging process may include at least one of scene anti-aliasing, alpha-blending (e.g., scene-by-scene), weighted averaging, etc. as are well within the knowledge of those skilled in the art. The averaging mode of operation may employ one or more of the timing relationships discussed hereinabove with respect to FIGS. 4, 5, and 6A, it being preferred that each of the graphics processors participating in this mode of operation complete rendering the image data into the respective rendering areas 120A–D of the local frame buffers 112A–D prior to the end of each blanking period (for example, see FIG. 4).

With reference to 7C, the layer blending mode preferably provides that at least some of the image data are rendered into the local frame buffers 112 (as shown, four such local frame buffers 112A–D are contemplated) of at least two of the graphics processors 104 such that each of the local frame buffers 112A–D includes frame image data representing at least a portion of the combined frame image data. For example, each portion of the combined frame image data may be an object of the final image. The layer blending mode preferably further provides that each of the portions of the combined frame image data area prioritized, such as by Z-data representing depth. The layer blending mode preferably further provides that the merge unit 106 is operable to synchronously produce the combined frame image data by layering each of the frame image data of the respective local frame buffers 112A–D in an order according to the priority thereof. For example, layering a second frame of frame image data over a first frame of frame image data may result in overwriting some of the first frame image data depending on the priority of the layers. When the priority of the layers corresponds with the relative depth of the portions of the combined frame image data (e.g., objects of the image), one layer of frame image data may be designated as being nearer to a point of view than another layer of frame image data. Therefore, an illusion of depth may be created by causing the layer of frame image data designated as being nearer to the point of view to overwrite at least portions of a layer of frame image data being farther from the point of view (for example, see FIG. 7C at 122). The layering mode of operation may employ one or more of timing relationships discussed hereinabove with respect to FIGS. 4, 5, and 6A, it being preferred that the graphics processors 104 participating in the layer blending mode complete rendering the image data into the respective local frame buffers 112A–D prior to the end of each blanking period.

Figure 7D:
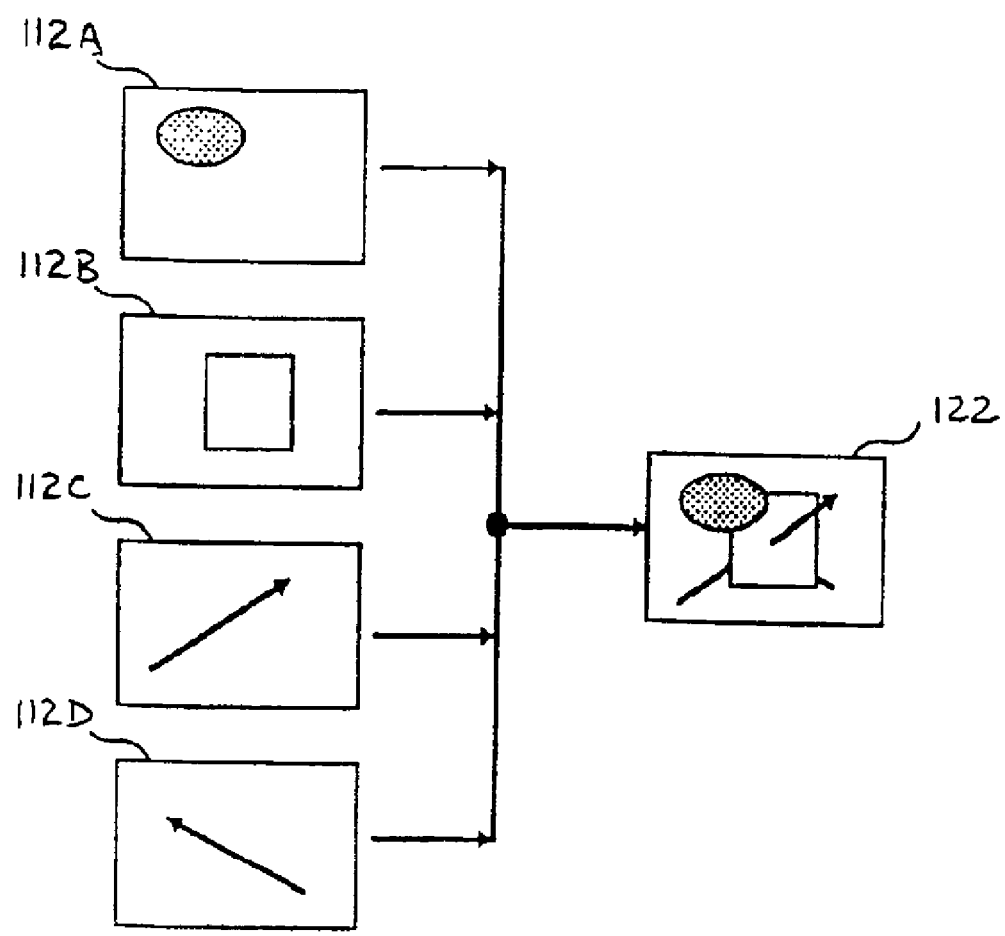

With reference to FIG. 7D, the Z-sorting and layer blending mode preferably provides that at least some of the image data are rendered into the local frame buffers (as shown, four such local frame buffers 112A–D are contemplated) of at least two of the graphics processors 104 such that the local frame buffers 112A–D include frame image data representing at least a portion of the combined image data. As discussed above with respect to the layer blending mode, the portions of the combined frame image data may represent objects of the image to displayed. The Z-sorting and layer blending mode preferably further provides that the frame image data include Z-values representing image depth (e.g., on a pixel-by-pixel basis) and that the merge unit 106 is operable to synchronously produce the combined frame image data by Z-sorting and layering each of the frame image data in accordance with the image depth. Advantageously, as shown in FIG. 7D, some portions of the combined frame image data, such as that stored in the local frame buffer 112A may overwrite other portions of the frame image data, such as that stored in local frame buffer 112B assuming that the relative depths dictated by the Z-values provide for such overwriting. The Z-sorting and layer blending mode may employ one or more of the timing relationships discussed hereinabove with respect to FIGS. 4, 5, and 6A, wherein it is preferred that the graphics processors 104 complete rendering the image data into the respective local frame buffers 112 prior to the end of each blanking period (for example, see FIG. 4).

Figure 7E:
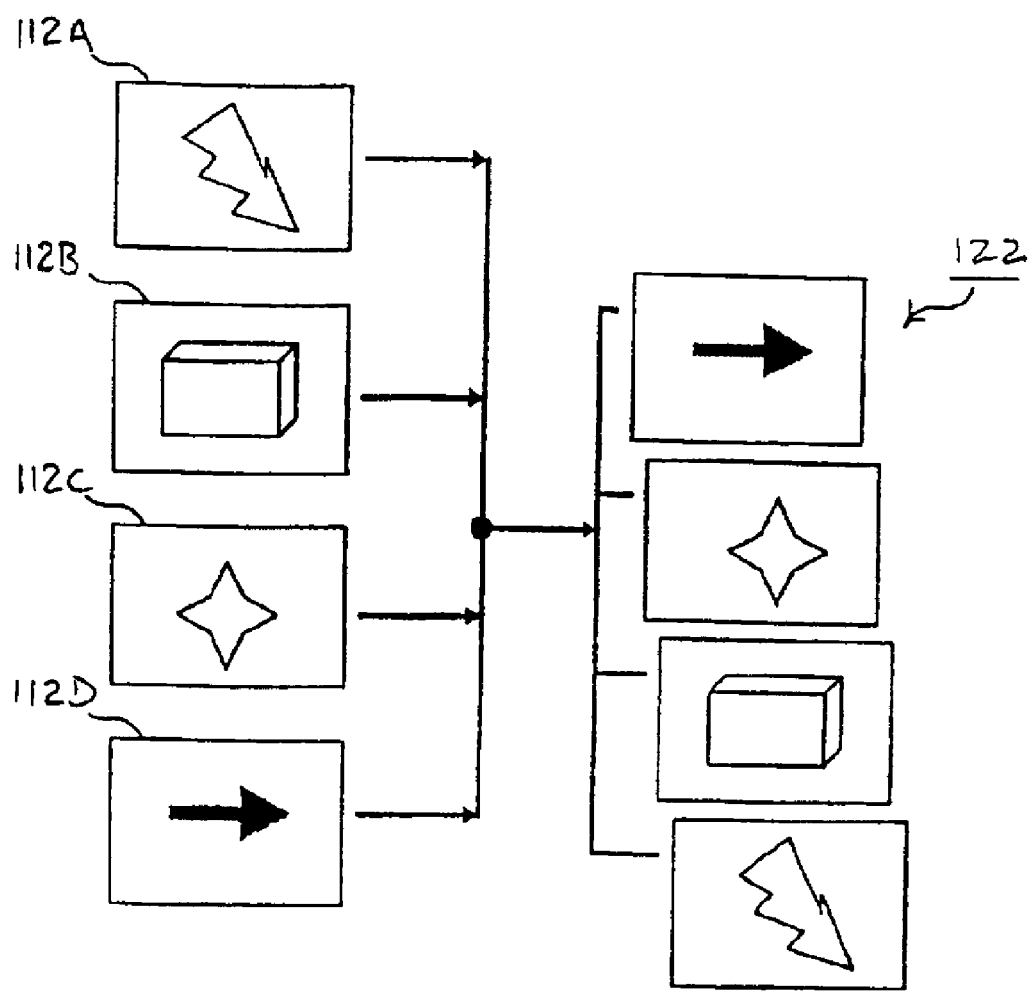

With reference to FIG. 7E, the flip animation mode preferably provides that the local frame buffers 112 (as shown, four local frame buffers 112A–D are contemplated) of at least two graphics processors 104 include frame image data that are capable of covering the total area covered by the combined frame image data and that the merge unit 106 is operable to produce the combined frame image data by sequentially releasing the respective frame image data from the local frame buffers 112 of the graphics processors 104. The flip animation mode may employ one or more of the timing relationships discussed hereinabove with respect to FIGS. 4, 5, and 6A, it being preferred that the graphics processors 104 complete rendering the image data into the respective frame buffers 112A–D prior to the ends of an integral number of blanking periods, where the integral number of blanking periods corresponds to the number of graphics processors 104 participating in the flip animation mode (for example, see FIGS. 5 and 6A). Alternatively, the integral number of blanking periods may correspond to the number of local frame buffers 112 participating in the flip animation mode.

Figure 8:
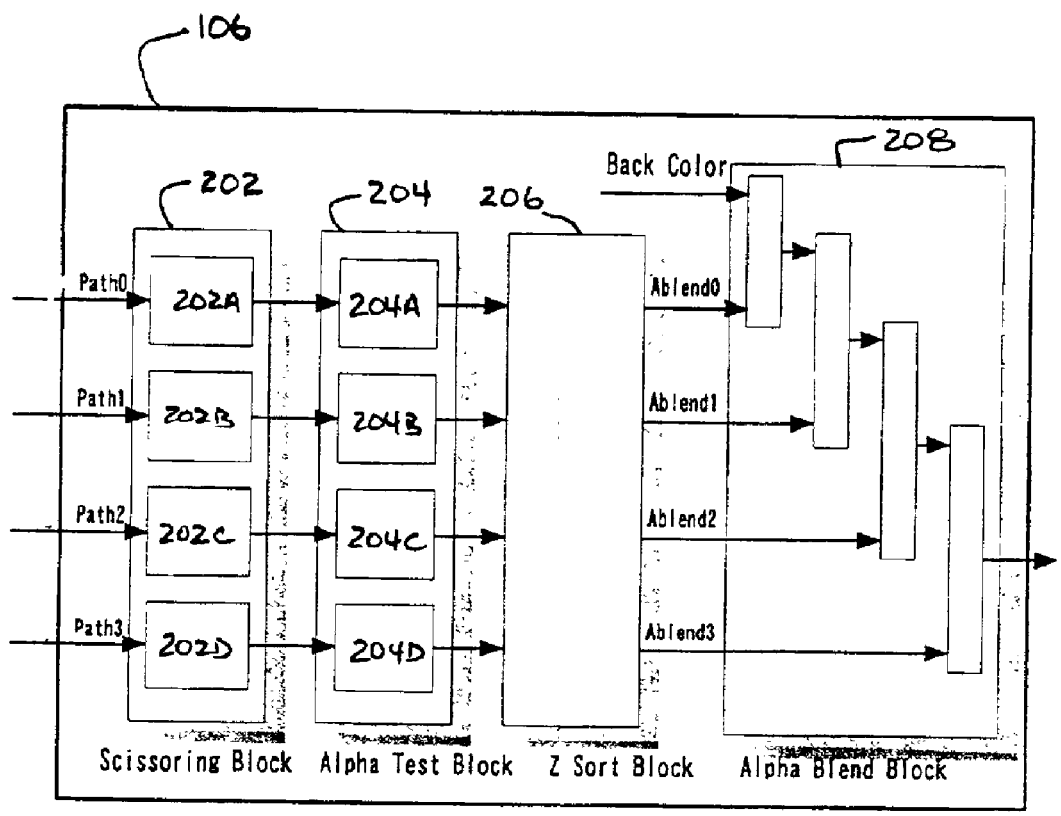
FIG. 8 is a block diagram illustrating additional details concerning a merge unit that may be employed in the apparatuses for processing image data shown in FIG. 3.

With reference to FIG. 8, an example of one circuit or function configuration suitable for implementing the merge unit 106 employed by the invention is shown. The merge unit 106 preferably includes a scissoring block 202, an alpha-test block 204, a Z-sort block 206, and an alpha-blending block 208. The scissoring block 202 preferably includes a plurality of sub-blocks 202A, 202B, 202C, 202D, etc., one such sub-block for each of the frame image data (or path) received. The scissoring block 202 in total, and the sub-scissoring blocks 202A–D in particular, is preferably operable to validate certain of the frame image data and to invalidate other portions of the frame image data (e.g., validating a portion of the frame image data corresponding to a given rectangular area for use in producing the combined frame image data). This functionality is particularly useful in operating in the area division mode (see FIG. 7A and corresponding discussion hereinabove).

The output of the scissoring block 202 is received by the alpha-test block 204, where certain of the frame image data are invalidated based on a comparison between alpha values of the frame image data and a constant. The alpha-test block 204 preferably includes a plurality of sub-blocks 204A, 204B, 204C, 204D, etc., one such sub-block for each of the frame image data (or path) received. The functionality of the alpha-test block 204 is particularly useful when the frame image data includes useful information concerning one or more objects utilized in producing the combined frame image data, but where other portions of the frame image data do not contain useful information. For example, if the frame image data is intended to represent a tree (i.e., an object utilized in the final image displayed), the alpha values associated with the pixels of the tree may be of sufficient magnitude to indicate that the data is valid, but the pixels of the frame image data associated with areas other than the tree may be unimportant and unusable and, therefore, advantageously discarded.

The Z-sort block 206 preferably performs Z-sorting of the frame image data on a pixel-by-pixel basis. Alternatively, the Z-sort block 206 may perform Z-sorting on a frame image data basis, e.g., selecting one of the four sources (or paths) of frame image data as representing a nearest image, selecting a next one of the sources of frame image data as being the next nearest image, etc. The alpha-blend block 208 preferably performs alpha-blending according to known formulas such as: $(1-\alpha) \cdot (\text{pixel}, n-1) + \alpha \cdot (\text{pixel}, n)$. As shown, alpha-blending is preferably performed among each of the frame data received.

Figure 9:
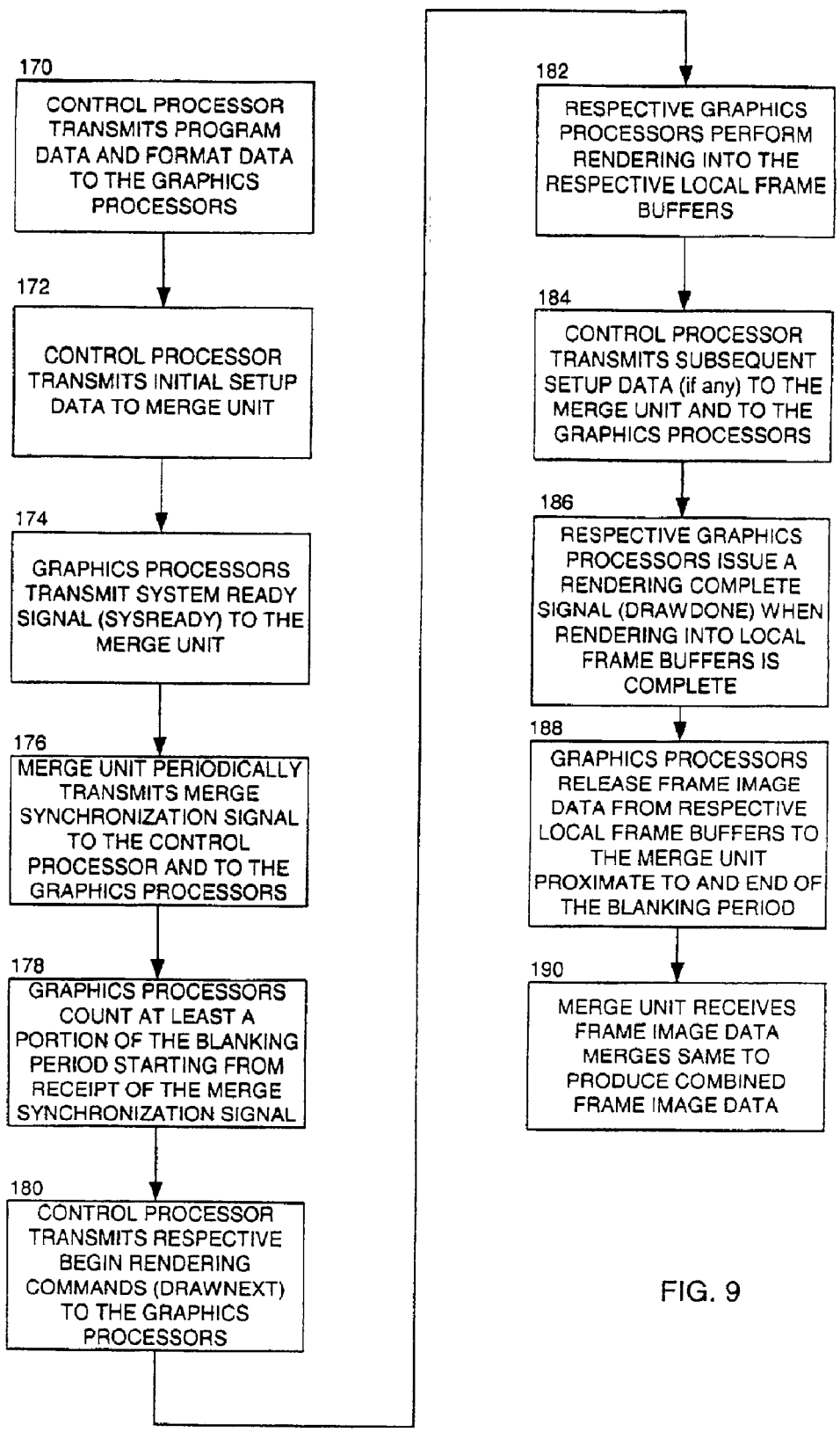
FIG. 9 is a process flow diagram illustrating actions that may be carried out by the apparatus of FIG. 3.

With reference to FIGS. 3, 4, and 9, the high level flow diagram of FIG. 9 provides additional details concerning one or more further aspects of the apparatus 110 of the present invention. Actions 170 and 172 relate to initializing the plurality of graphics processors 104, the merge unit 106, and the synchronization unit 108. In particular, at action 170, the control processor 102 preferably transmits program data and format data to the graphics processors 104. In accordance with the invention, the program data and the format data preferably imbue the graphics processors 104 with the necessary capability to carry out one or more of the modes of operation discussed hereinabove with respect to FIGS. 4–7.

The program data, for example, may include at least portions of one or more software application programs used by the graphics processors 104 to processing the image data. Such software application programs may facilitate certain processing functions, such as polygonal spatial transformation, 3D–2D conversion, magnification/reduction (i.e., scaling), rotation, lighting, shading, coloring, etc. In general, the program data preferably facilitates the production of the sequence instructions, such as a sequence of polygonal instructions produced from the image data and suitable for rendering into the local frame buffers 112. Preferably, the program data are transmitted to the plurality of graphics processors 104 by way of the bus 126.

The format data preferably relate to at least one of the modes of operation (e.g., the timing relationships, area division, averaging, layer blending, z-sorting and layer blending, flip animation, etc.); display protocol information, such as the NTSC protocol, the HDTV protocol, the 35 mm film cinematography protocol, etc. More particularly, the display protocol may include information concerning the desired frame rate, blanking period, the display size, the display aspect ratio (e.g., the ratio between the display height to width), the image resolution, etc. In general, the format data ensure that the graphics processors 104 are configured to execute a particular mode or modes of operation before called upon to render the image data or release frame image data to the merge unit 106. Preferably, the format data are transmitted to the plurality of graphics processors 104 by way of the bus 126.

At action 172, initial set-up data are transmitted to the merge unit 106. The initial setup data preferably includes a substantially similar set of data as the format data. In this way, the graphics processors 104 and the merge unit 106 are configured to execute the same mode or modes of operation. Preferably, the initial setup data are transmitted to the merge unit 106 by way of bus 126.

The graphics processors 104 preferably transmit system ready signals to at least one of the respective local synchronization units 118 and the control processor 102 when they have initialized themselves consistent with the program data and format data (action 174). The system ready signals may have any suitable name, such as SYSREADY. The system ready signals are preferably transmitted to the control processor 102 by way of the bus 126.

The synchronization circuit 108 preferably periodically transmits the merge synchronization signal 132 to the control processor 102 and to the graphics processors 104. Alternatively, the merge unit 106 periodically transmits the merge synchronization signal 132 to the graphics processors 104. In either case, the merge synchronization signal 132 is synchronized to a desired frame rate and blanking period associated with the desired display protocol (action 176). The merge synchronization signal 132 is preferably transmitted to the graphic processors 104 by way of the dedicated synchronization lines 129 (or by way of the merge unit 106) and to the control processor 102 by way of the bus 126. When the graphics processors 104 include a local synchronization circuit 118, they preferably count a predetermined number of clock signals (or cycles) between transitions of the merge synchronization signal 132 to ensure that the frame image data are released at the proper time (action 178).

At action 180, the control processor 102 preferably transmits a begin rendering command instruction (or trigger) DRAWNEXT indicating that the graphics processors 104 should initiate the rendering of the image data into the respective local frame buffers 112. This trigger may be transmitted to the graphics processors 104 over the bus 126, it being preferred that the trigger is issued through the synchronization unit 108 to the respective local synchronization units 118 of the graphics processors 104. As discussed above, however, the graphics processors 104 need not receive an explicit trigger from the control processor 102 if an application software program running locally on the processing units 114 provides a begin rendering command itself. Certain advantages, however, are achieved when the control processor 102 issues a trigger to at least some of the graphics processors 104 indicating when the graphics processors 104 should begin rendering the image data into the respective local frame buffers 112. At action 182, the respective graphics processors 104 perform the rendering function on the image data to produce the frame image data and store the same in the respective local frame buffers 112.

At action 184, the control processor 102 may transmit subsequent setup data to the graphics processors 104 and the merge circuit 106. For example, to change the mode of operation from frame to frame.

At action 186, at least one of the graphics processors 104 preferably issues a signal to the control processor 102 indicating that rendering is complete (e.g., DRAWDONE). The rendering complete signal may be transmitted to the control processor 102 by way of the bus 126, it being preferred that the signal is transmitted through the local synchronization circuit 118 to the synchronization unit 108 prior to being delivered to the control processor 102.

At action 188, the appropriate graphics processors 104 release the frame image data from the respective local frame buffers 112 to the merge unit 106 (e.g., when the merge synchronization signal 132 indicates that the end of an appropriate blanking period has been reached) and the merge unit 106 produces the combined frame image data for display (action 190). At least some of these processes are repeated frame-by-frame to produce a high quality moving image for display on the display screen.

Figure 10:
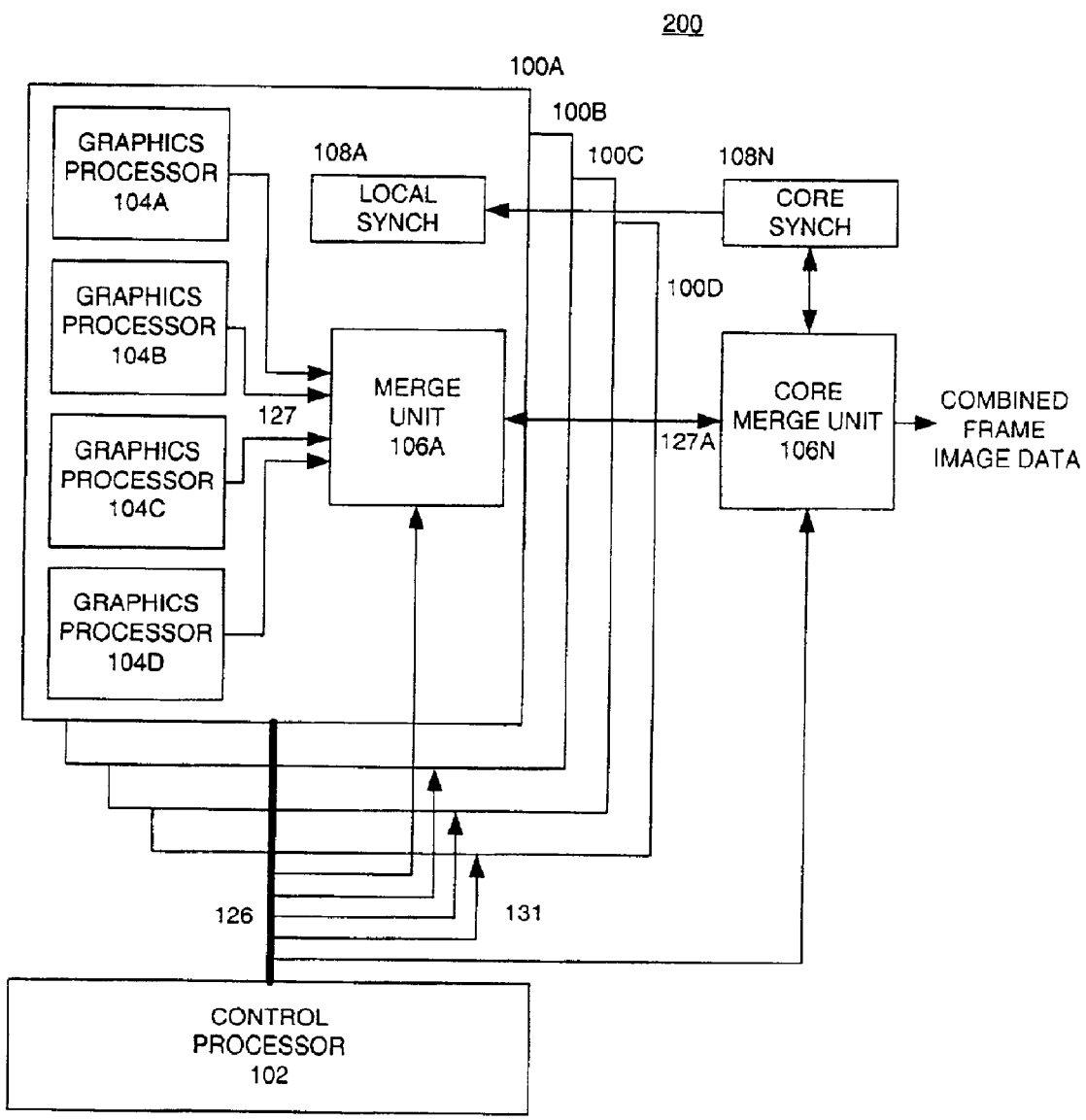
FIG. 10 is a block diagram illustrating an apparatus for processing image data in accordance with one or more further aspects of the present invention.

Advantageously, the apparatus 100 readily lends itself to scalability when additional data throughput is required. Referring now to FIG. 10, an apparatus 200 for processing image data to produce an image for display in accordance with one or more further aspects of the present invention is shown. The apparatus 200 includes a control processor 102, a plurality of graphics apparatuses 100A–D, a core merge unit 106N, and a core synchronization unit 108N. The respective graphics apparatuses 100A, 100B, 100C, etc. in FIG. 10 are preferably substantially similar to the apparatus 100 shown in FIG. 3. The merge unit 106 of FIG. 3 corresponds to respective local merge units 106A, 106B, 106C, etc. that are coupled to respective sets of graphics processors 104. The local merge units 106A, 106B, 106C, etc. each preferably produce local combined frame image data consistent with the modes of operation discussed hereinabove. Each of the local merge units 106A, 106B, 106C, etc. are preferably coupled to the core merge unit 106N, which is operable to synchronously receive the local combined frame image data and to synchronously produce combined frame image data to be displayed.

The core merge unit 106N is preferably operable to produce the merge synchronization signal 132 and each apparatus 100A, 100B, 100C, etc. preferably includes a local synchronization unit 108A, 108B, 108C, etc., respectively, (that corresponds to the synchronization unit 108 of FIG. 3). The respective local synchronization units 108A, 108B, 108C, etc. preferably utilize the merge synchronization signal 132 to ensure that the frame image data are synchronously released to each of the local merge units 106A, 106B, 106C, etc. and ultimately released to the core merge unit 106N.

Preferably, the respective local frame buffers 112 of the respective groups of graphics processors 104A–D are operatively coupled to the respective local merge units 106A–D by way of separate data lines 127 such that exclusive communication between the respective local frame buffers and the respective local merge units is obtained (e.g., such that exclusive transmission of the frame image data to the respective local merge units 106A, 106B, 106C, etc. is obtained). Preferably, separate data lines 127A–D couple the respective local merge units 106A–D to the core merge unit 106N such that exclusive communication therebetween is obtained (e.g., such that exclusive transmission of the local combined frame image data from the respective local merge units 106A–D to the core merge unit 106N is obtained). Further, separate synchronization lines preferably couple the respective local synchronization units 108A–D to the core synchronization unit 108N such that exclusive communication therebetween is obtained. Although not explicitly shown, a bus, substantially similar to the bus 126 of FIG. 3, preferably extends from the control processor 102 to each of the graphics processors 104A, 104B, 104C, etc., the core merge unit 106N, and the core synchronization unit 108N.

Figure 11:
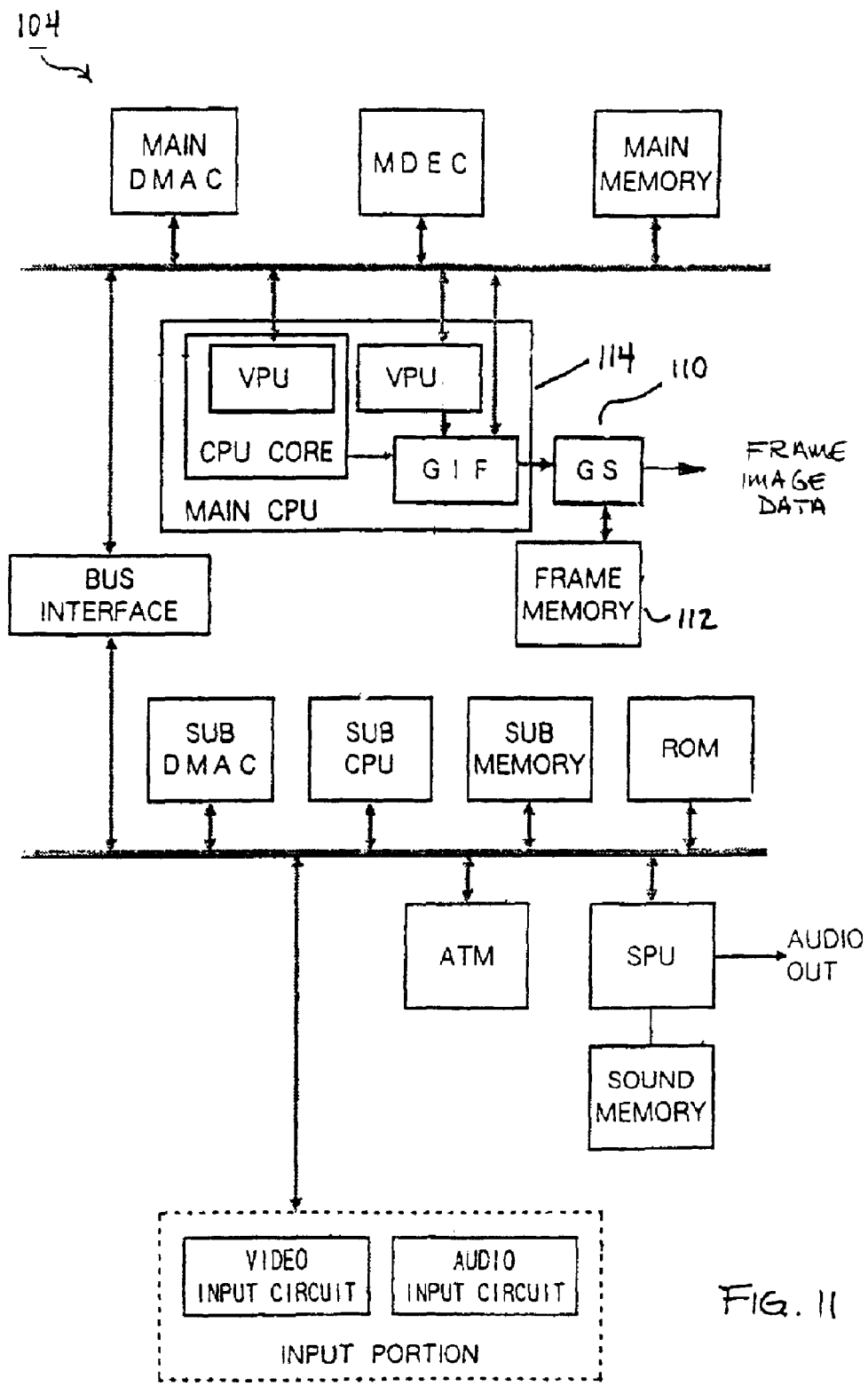
FIG. 11 is a block diagram of a preferred graphics processor in accordance with one or more aspects of the present invention that may be employed in the apparatus of FIG. 3.

As was discussed above with respect to FIG. 9, the apparatus 200 preferably operates according to the high level flow diagram shown such that one or more of the modes of operation (see FIGS. 4–7) may be carried out, preferably on a frame-by-frame basis. More particularly, the control processor 102 is preferably operable to transmit subsequent setup data to the respective apparatuses 100A–D, e.g., to the graphics processors 104, the local merge units 106A–D, and the core merge unit 106N on a frame-by-frame basis. Preferably, the core merge unit 106N and the respective local merge units 106A–D are operatively coupled to the control processor 102 by way of separate control data lines 131 such that exclusive communication between the control processor 102, the core merge unit 106N, and the respective local merge units 106A–D at least concerning the instructions to operate in different modes from one frame to the next is obtained With reference to FIG. 11, each of the graphics processors 104 is preferably implemented consistent with the block diagram shown. The salient functions of rendering 110, frame buffering 112, processing 114, etc. discussed above are labeled as such, it being understood that the specific details concerning the operation of this configuration may be found in co-pending U.S. patent application Ser. No. 09/502,671, filed Feb. 11, 2000, entitled GAME MACHINE WITH GRAPHICS PROCESSOR, assigned to the assignee of the instant invention, and the entire disclosure of which is hereby incorporated by reference.

Figure 12:
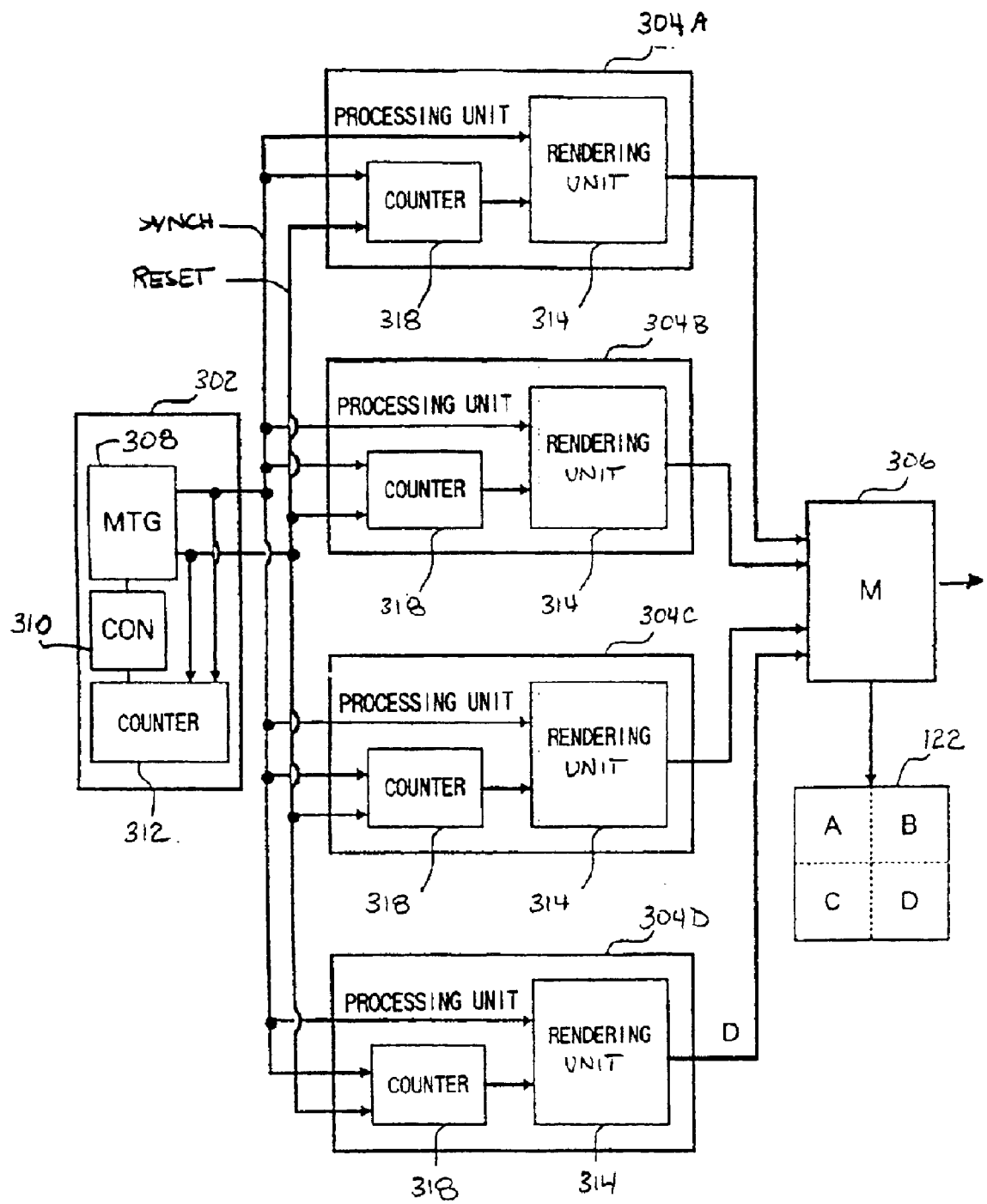
FIG. 12 is a block diagram of an apparatus for processing image data in accordance with one or more further aspects of the present invention.

Reference is now made FIG. 12, which illustrates an apparatus 300 for processing image data to produce an image for display in accordance with one or more further aspects of the present invention. The apparatus 300 preferably includes a control processor 302, a plurality of graphics processors 304, and a merge unit 306. The control processor 302 is preferably operable to provide instructions to the plurality of graphics processors 304. The control processor 302 preferably includes a master timing generator 308, a controller 310, and a counter 312. The master timing generator 308 is preferably operable to produce a synchronization signal that is synchronized with blanking periods of a display protocol, such as one or more of the display protocols discussed hereinabove. The controller 310 is preferably operable to provide instructions to the plurality of graphics processors 304 similar to the instructions that the control processor 102 of FIG. 3 provides to the graphics processors 104 of the apparatus 100. In addition, the control processor 302 preferably provides reset signals to the plurality of graphics processors 304 (utilized in combination with the synchronization signal) to synchronize the release of frame image data to the merge unit 306 as will be discussed in more detail below.

Each of the graphics processors 304 preferably includes a rendering unit 314 operable to render image data into frame image data and to store the frame image data in a respective local frame buffer (not shown). Indeed, each graphics processor 304 preferably includes at least some of the functional blocks employed in the graphics processors 104 of FIG. 3. In addition, each graphics processor 304 preferably includes a synchronization counter 318 operable to produce a local synchronization count indicating when the frame image data should be released from the local frame buffer. The respective synchronization counters 318 preferably one of increment and decrement their respective synchronization counts based on the synchronization signal from the timing generator 308. The graphics processors 304 are preferably operable to release their respective frame image data to the merge unit 306 when their respective local synchronization counts reach a threshold. The reset signals issued by the control 310 of the control processor 302 are preferably utilized to reset the synchronization counters 318 of the respective graphics processors 304. In this way, the control processor 302 is operable to manipulate the timing of the release of the frame image data from the respective rendering units 314. Thus, the apparatus 300 may facilitate the modes of operation discussed hereinabove with respect to FIGS. 4–7, e.g., the timing relationships, area division, averaging, layer blending, z-sorting and layer blending, and flip animation.

Figure 13A:
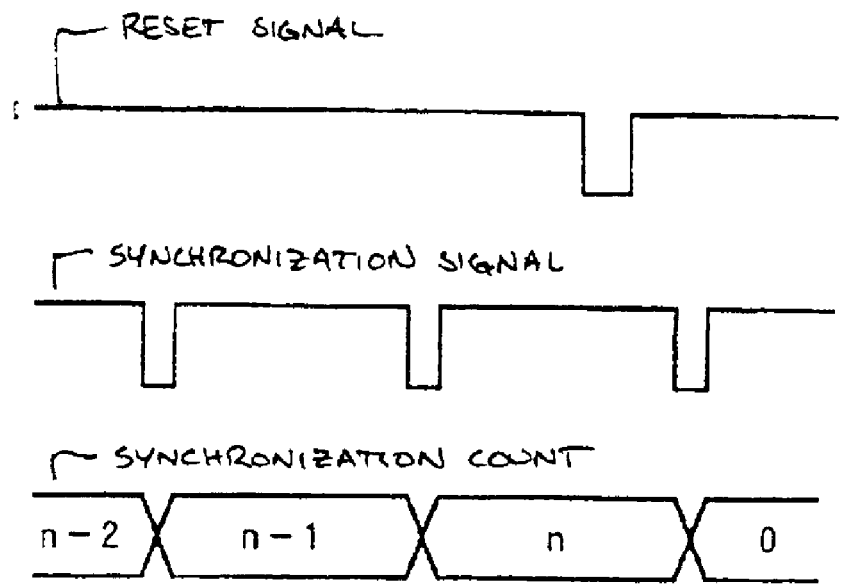
FIGS. 13A–13B are timing graphs that may be employed by the apparatus of FIG. 12.
Figure 13B:
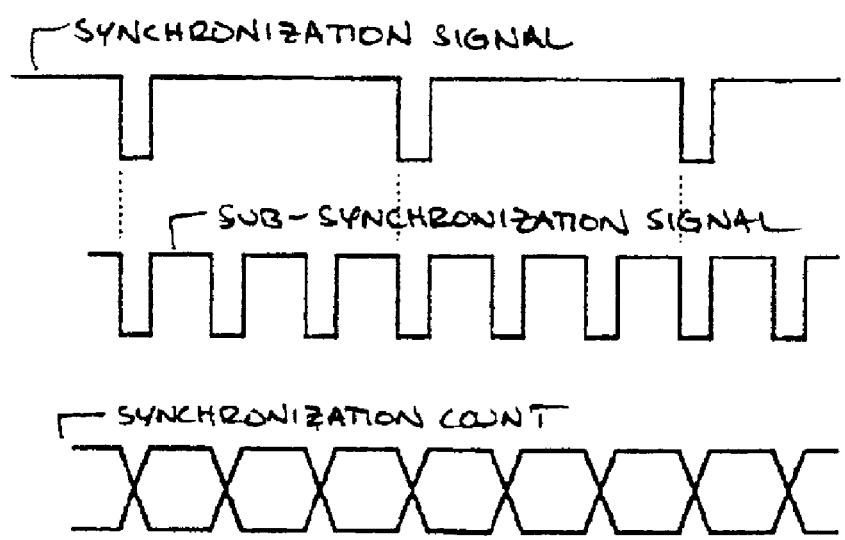

With reference to FIG. 13A, timing relationships between the synchronization signal issued by the timing generator 308, the reset signal, and a respective one of the synchronization counters 318 are illustrated. In particular, the synchronization counter 318 increments (or decrements) on transitions of the synchronization signal. The reset signal, however, resets the synchronization counter 318 to begin counting from a predetermined level, such as zero. With reference to FIG. 13B, an alternative configuration may be employed to achieve a finer timing accuracy. In particular, the synchronization counters 318 may be substituted by, or operate in conjunction with, sub-synchronization counters (not shown) and the timing generator 308 may produce a sub-synchronization signal operating at a higher frequency than the synchronization signal. The sub-synchronization counters preferably one of increment and decrement in response to transitions of the sub-synchronization signal and are reset upon receipt of the reset signal from the control processor 302. Using this arrangement, the graphics processors 304 are preferably operable to release their respective frame image data to the merge unit 306 when the respective sub-synchronization counters reach a threshold (which would be higher than the threshold employed using the timing of FIG. 13A).

With reference to FIGS. 10 and 12, the apparatus 300 may be scaled in a substantially similar way as shown in FIG. 10, i.e., where the plurality of graphics processors 304 are grouped into respective sets, each set being coupled with a local merge unit; and the respective local merge units being coupled to a core merge unit. The core merge unit is preferably operable to synchronously receive the local combined frame image data from the respective local merge units and to synchronously produce the combined frame image data thereon.

Figure 14:
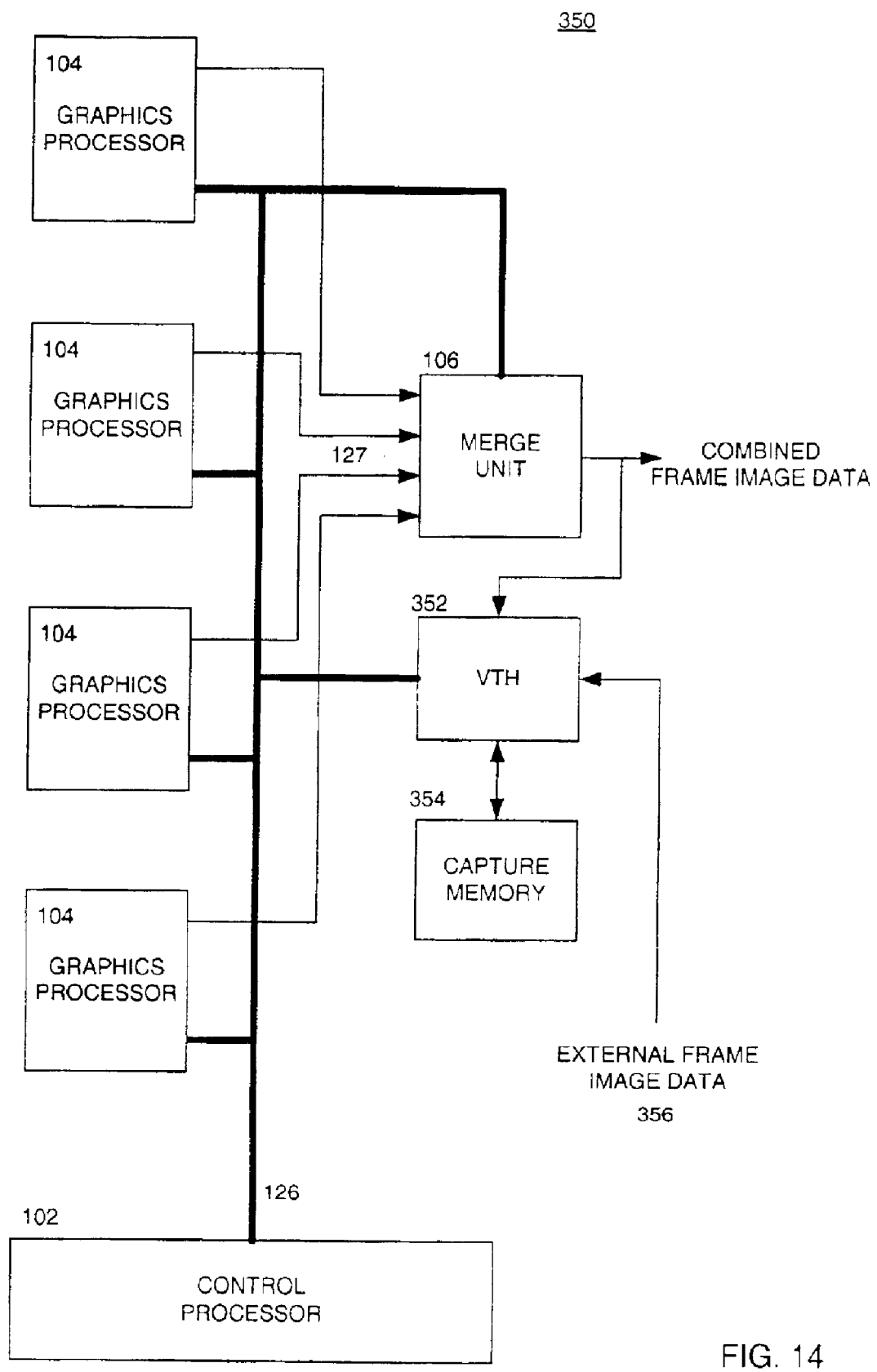
FIG. 14 is a block diagram of an apparatus for processing image data in accordance with one or more further aspects of the present invention.

Reference is now made to FIG. 14, which is a block diagram of an apparatus 350 that operates in accordance with one or more further aspects of the present invention. In some respects, the apparatus 350 is substantially similar to the apparatus 100 of FIG. 3. For example, the apparatus 350 includes a plurality of graphics processors 104, one or more of which are preferably operable to render image data into frame image data and to store the frame image data in a respective local frame buffer. Indeed, the graphics processors 104 of apparatus 350 are preferably substantially similar to the graphics processors 104 of FIG. 3. The apparatus 350 also includes at least one merge unit 106 operatively coupled to the plurality of graphics processors 104 and operable to synchronously receive the frame image data from the respective local frame buffers of the graphics processors 104 and to synchronously produce combined frame image data based thereon. The apparatus 350 also includes a control processor 102 operatively coupled to the graphics processors and the merge unit 106. It is most preferred that the portions of the apparatus 350 discussed to this point are substantially similar to those of FIG. 3 and, further, that the functionality of the apparatus 350 is substantially similar to the functionality of the apparatus 100 of FIG. 3.

The apparatus 350 also preferably includes a video transfer hub (VTH, or simply video hub) 352 operatively coupled to the output of the merge unit 106, i.e., operable to receive at least one frame of the combined frame image data. The video hub 352 is preferably further operable to receive at least one externally provided frame of frame image data 356. The video hub 352 is preferably coupled to the plurality of graphics processors 104 and the control processor 102 by way of the bus 126. The apparatus 350 also preferably includes a capture memory 354 operatively coupled to the video hub 352 and capable of receiving, storing, and subsequently releasing either or both of the at least one frame of combined frame image data and the at least one frame of external frame image data 356.

Upon command by one or more of the graphics processors 104, or by the control processor 102, the video hub 352 preferably facilitates the transmission of the at least one frame of the combined frame image data and/or the at least one frame of external frame image data 356 to one or more of the graphics processors 104. The one or more graphics processors 104 may then utilize the frame image data transmitted by the video hub 352 to produce a successive frame or frames of frame image data. Moreover, the merge unit 106 may receive these frame(s) of frame image data and produce a next frame of the combined frame image data based thereon.

By way of example, the video hub 352 may be utilized to combine frame image data from an external source (e.g., from film that has been digitized, from a separate graphics processing unit, from a source of streaming video, etc.) with one or more frames of frame image data being processed by the apparatus 350. This functionality is particularly advantageous when images from film, such as 35 mm cinematography, are to be combined with digitally generated images to achieve desirable special effects in the final moving image.

As the apparatus 350 is capable of synchronizing the merging function performed by the merge unit 106 in accordance with a display protocol, such as the display protocol of the external frame image data 356, high quality combined images may be achieved. Furthermore, as the apparatus 350 may be readily scaled, very high data throughput may be achieved to match or exceed the image quality standards of external images, such as film. It is noted that the apparatus 350 of FIG. 14 may be scaled in a substantially similar way as that of the apparatus 100 of FIG. 3 as discussed hereinabove with respect to FIG. 10. Indeed, one or more video hubs 352 (and one or more capture memories 354) may be employed in a circuit topology substantially similar to FIG. 10 to achieve higher data throughputs.

Figure 15:
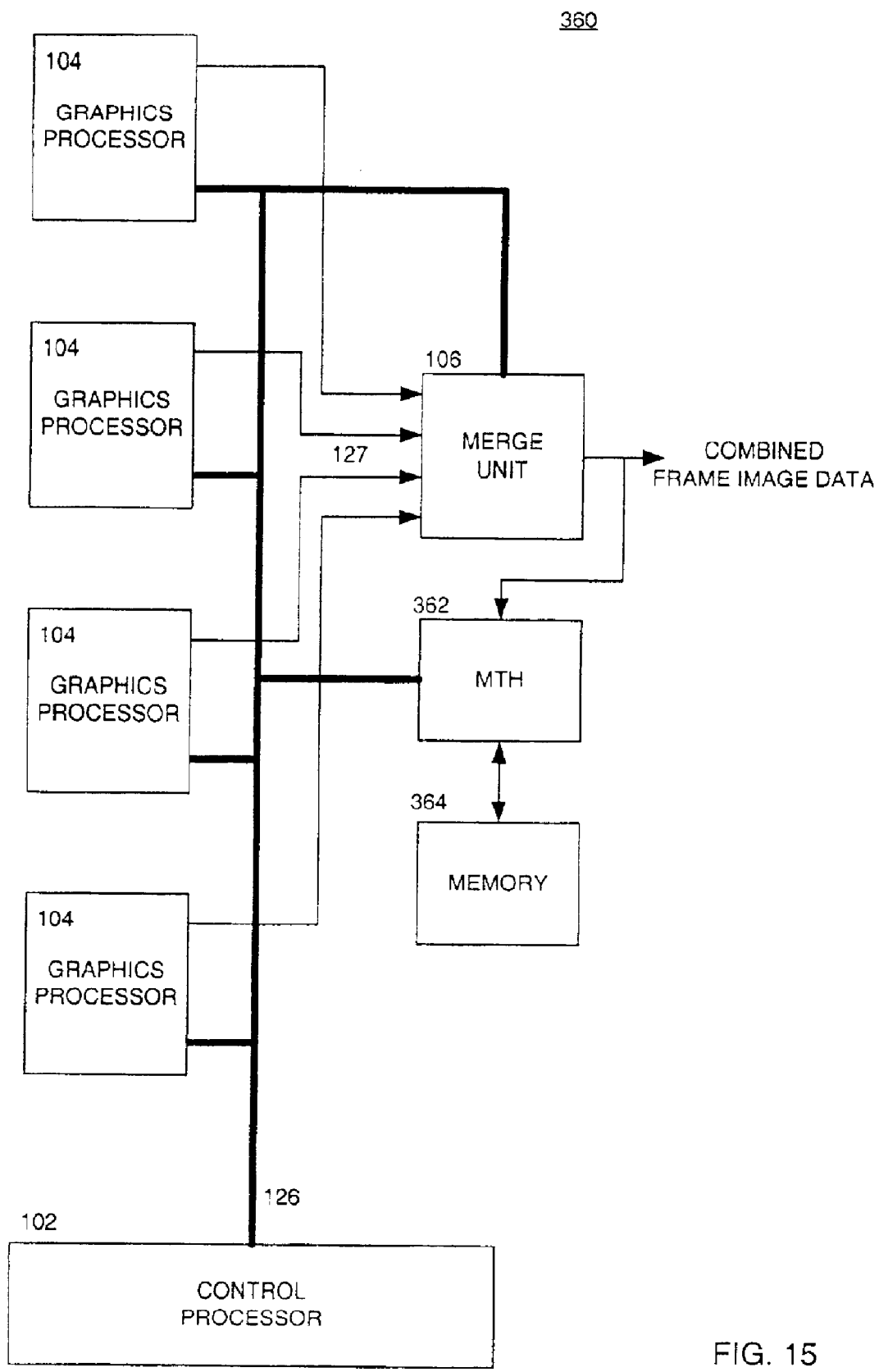
FIG. 15 is a block diagram of an apparatus for processing image data in accordance with one or more further aspects of the present invention.

Reference is now made to FIG. 15, which illustrates an apparatus 360 suitable for use in accordance with one or more further aspects of the present invention. The apparatus 360 preferably includes several functional and/or circuit blocks that are substantially similar to those of FIG. 3, namely, a plurality of graphics processors 104 coupled to at least one merge unit 106 and to a control processor 102. Indeed, the apparatus 360 is preferably substantially similar to the apparatus 100 of FIG. 3 with respect to these functional blocks. The apparatus 360, however, further includes a memory transfer hub (MTH or simply memory hub) 362 operable to receive (for example, over the bus 126) and store common image data. A memory 364 is preferably operatively coupled to the memory hub 362 such that the common image data may be stored and retrieved therefrom. The common image data may take any form, such as texture data used when polygons are rendered into the respective local frame buffers. It is noted that such texture data often occupies a relatively large portion of memory, particularly when it has been decompressed. In order to reduce the amount of memory required at each of the plurality of graphics processors 104, the common image data (such as texture data) is preferably centrally stored in memory 364. When one or more of the graphics processors 104 requires the common image data, the memory hub 362 preferably retrieves the common image data from the memory 364 and transfers that data to the one or more graphics processors 104.

It is noted that the memory hub 362 and associated memory 364 may be utilized in a scaled system, such as that shown in FIG. 10 and/or FIG. 14 depending on the exigencies of the application.

Figure 16:
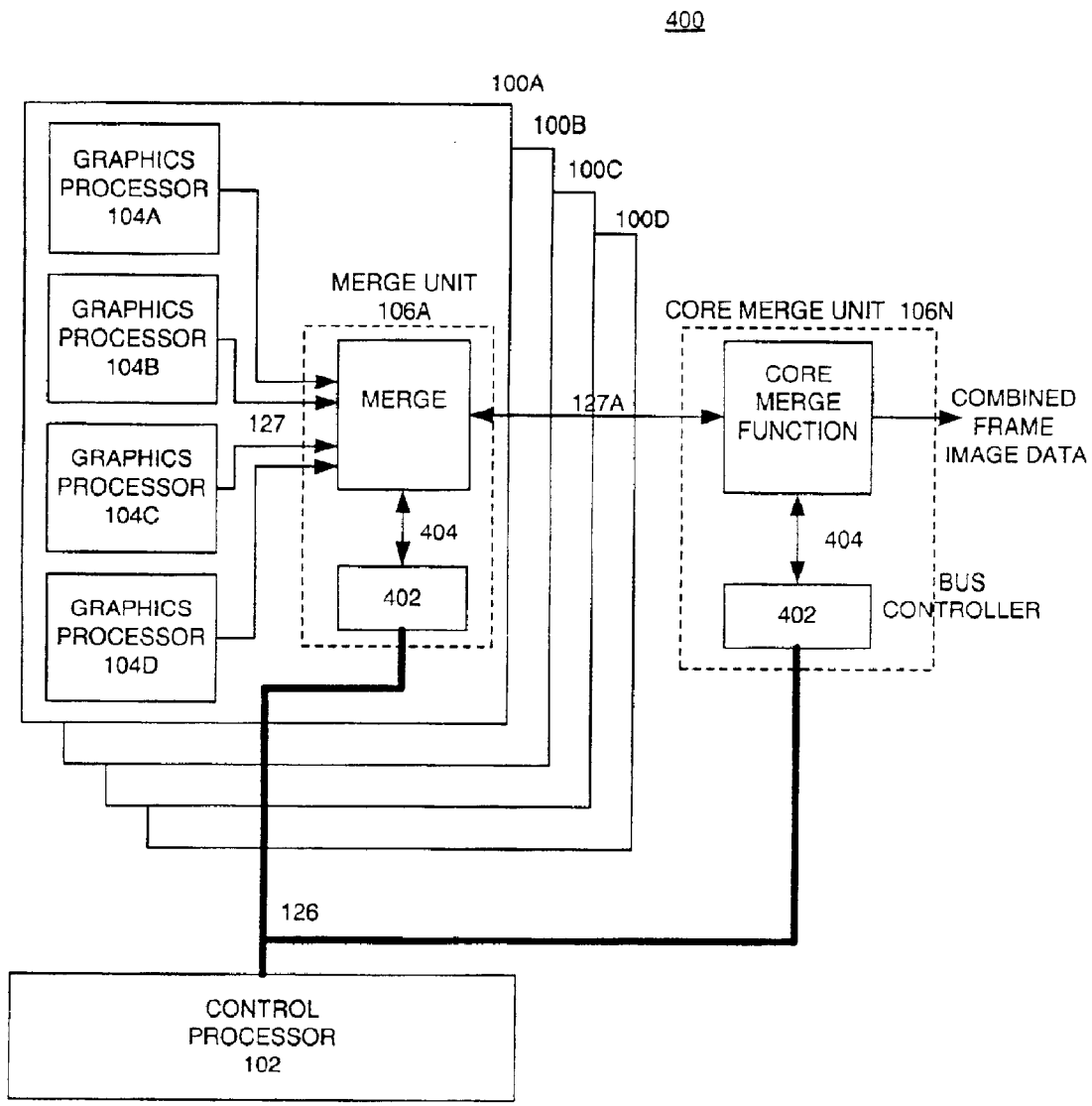
FIG. 16 is a block diagram of an apparatus for processing image data in accordance with one or more further aspects of the present invention.

Reference is now made to FIG. 16, which is a block diagram illustrating an apparatus 400 suitable for use in accordance with one or more further aspects of the present invention. In many respects, the apparatus 400 is substantially similar to the apparatus 200 of FIG. 10. In particular, the apparatus 400 includes a control processor 102, a plurality of graphics apparatuses 100A–D, and a core merge unit 106N. Notably, the apparatus 400 does not require a core synchronization unit 108N as did the apparatus 200 of FIG. 10. The functionality of these functional and/or circuit blocks are substantially similar to those discussed hereinabove with respect to FIGS. 3 and 10 and, therefore, will not be repeated here.

The core merge unit 106N of apparatus 400 preferably includes a bus controller function 402 operatively coupled between the bus 126 and a control data bus 404, where the control data bus 404 communicates with the local merge units 106A–D and the core merge unit 106N. The local merge units 106A–D also preferably include a bus controller function 402. Although the bus controller functions 402 are shown as being implemented within the core merge unit 106N and within the local merge units 106A–D, it is understood that these functions may be separate from the core merge unit 106N and the local merge units 106A–D without departing from the scope of the invention. It is noted that the respective local merge units 106A–D are operatively coupled to the core merge unit 106N by way of the separate data lines 127A–D such that exclusive transmission of the local combined frame image data from the respective local merge units 106A–D to the core merge unit 106N is obtained.

As discussed hereinabove with respect to FIG. 9, the apparatus 400, like the apparatus 200, preferably operates according to the high level flow diagram of FIG. 9 such that one or more of the modes of operation (see FIGS. 4–7) may be carried out, preferably on a frame-by-frame basis. More particularly, the control processor 102 is preferably operable to transmit subsequent setup data to the respective apparatuses 100A–D on a frame-by-frame basis, where the setup data establishes the mode of operation of the graphics processors 104 and the merge units 106. The control processor 102 preferably communicates at least the instructions concerning the one or more modes of operation (i.e., the setup data) to the respective local merge units 106A–D and the core merge unit 106N by way of the bus controller functions 402 and the control data bus 404.

As discussed above with respect to apparatus 200 of FIG. 10 and apparatus 100 of FIG. 3, the core merge unit 106N is preferably operable to produce the merge synchronization signal 132 to facilitate synchronous release of the frame image data, the release of the local combined frame image data, and the production of the combined frame image data. The core merge unit 106N may transmit the merge synchronization signal 132 to the respective graphics processors 104 by way of the control data bus 404, and the data bus 126. In order to ensure that the merge synchronization signal 132 is transmitted quickly and received promptly by the apparatuses 100A–D, the bus controller function 402 is preferably operable to seize control of the data bus 126 upon receipt of the merge synchronization signal 132 over the control data bus 404 and transmit the merge synchronization signal 132 to the respective apparatuses 100A–D on a priority basis. Thus, the bus controller function 402 provides the function of a master bus controller. Alternately, the core merge unit 106N may transmit the merge synchronization signal 132 to the respective graphics processors 104 by way of the control data bus 404 and the local merge units 106A–D.

In accordance with the one or more aspects of the invention embodied in the apparatus 400 of FIG. 16, the advantageous elimination of separate control data lines between the control processor 102, the local merge units 106A–D and the core merge unit 106N in favor of a common control bus 404 is achieved. Thus, scalability of the overall apparatus is simplified and freedom to partition the functional blocks of the apparatus in different ways is obtained.

Figure 17:
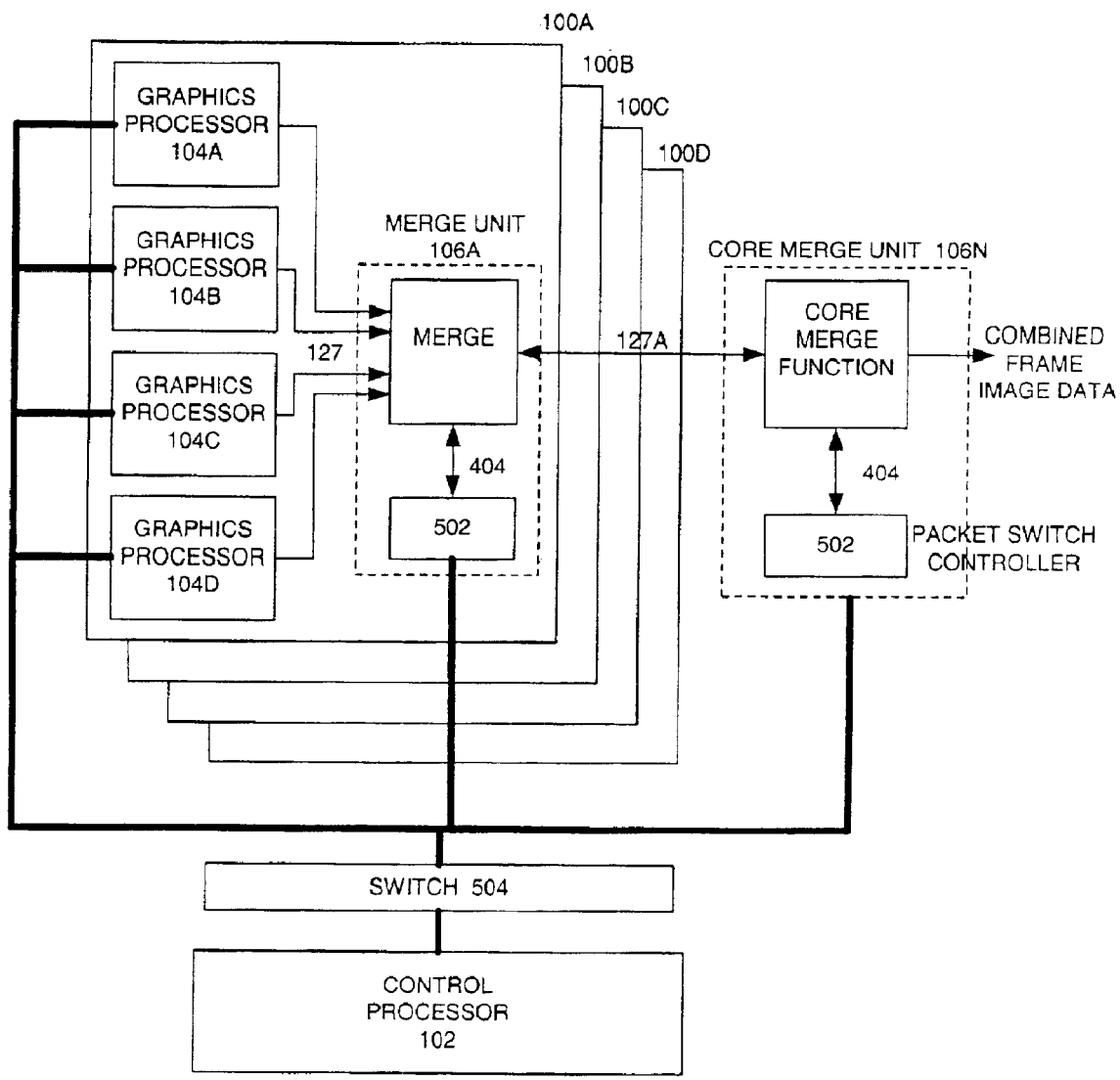
FIG. 17 is a block diagram of an apparatus for processing image data in accordance with one or more further aspects of the present invention.

Reference is now made to FIG. 17, which is a block diagram illustrating an apparatus 500 suitable for use in accordance with one or more further aspects of the present invention. In many ways, the apparatus 500 of FIG. 17 is substantially similar to the apparatuses of FIGS. 10 and 16 as will be readily apparent to one skilled in the art when the common functional and/or circuit blocks are noted, such as the plurality of graphics processing apparatuses 100A–D, the plurality of graphics processors 104, the plurality of local merge units 106A–D, the core merge unit 106N, and the control processor 102. Accordingly, details concerning these functional and/or circuit blocks will be omitted for purposes of clarity.

The apparatus 500 is preferably operable to function using a "connectionless network" in which the data transmitted between certain functional and/or circuit blocks are routed over a packet-switched network. The data are organized into packets in accordance with a transmission control protocol (TCP) layer of the packet-switched network. Each packet includes an identification number identifying it as being associated with a particular group of packets and an address of the destination functional and/or circuit block on the packet-switched network. The TCP at the destination permits the reassembly of the packets into the original data.

Turning to the particular features of the apparatus 500, a packet switch 504 is operatively coupled to the control processor 102, the respective apparatuses 100A–D, the plurality of graphics processors 104, and one or more packet switch controller functions 502 within the core merge unit 106N and the respective local merge units 106A–D. It is noted that the packet switch controller functions 502 may be implemented separately from the core merge unit 106N and/or the local merge units 106A–D without departing from the scope of the invention. As the graphics processors 104 are coupled to the control processor 102 by way of the packet-switched network, the program data and the format data may be transmitted to the graphics processors 104 in packetized form. Thus, the one or more software application programs facilitating, for example, polygonal spatial transformation, 3D–2D conversion, magnification, reduction, rotation, lighting, shading, coloring, etc., may be transmitted to the graphics processors through the packet switch 504.

It is noted that certain interconnections between functional and/or circuit blocks of the apparatus 500 are not made by way of the packet-switched network. For example, the plurality of graphics processors 104 are coupled to the respective local merge units 106 by way of separate dedicated data lines 127. Similarly, the plurality of local merge units 106 are coupled to the core merge unit 106N by way of dedicated data lines 127A–D. Still further, the transfer of instructions from the control processor 102 to the local merge units 106A–D and the core merge unit 106N are at least in part transmitted over the common control bus 404 discussed above with respect to FIG. 16.

The control processor 102 is preferably operable to instruct the graphics processors 104, the local merge units 106A–D, and the core merge unit 106N to operate in the one or more modes of operation on a frame-by-frame basis as discussed in detail hereinabove with respect to other configurations of the invention. In particular, the control processor 102 preferably communicates instructions concerning the one or more modes of operation to the respective destination function and/or circuit blocks by way of the packet switch 504, the instructions having been packetized in accordance with the TCP layer. Further, the core merge unit 106N is preferably operable to produce the merge synchronization signal 132 as discussed in detail hereinabove. The core merge unit 106N may be operable to transmit the merge synchronization signal 132 to various destination functional and/or circuit blocks by way of the control data bus 404, the packet switch controller function 502, and the packet switch 504.

The packet switch controller function 504 may be capable of seizing control of the packet switch 504 when the core merge unit 106N transmits the merge synchronization signal 132 over the control data bus 404 such that the merge synchronization signal 132 may be promptly transmitted to the destination functional and/or circuit blocks. When the TCP layer is capable of transmitting very quickly and guarantees the routing of all packets of an instruction to any of the destination functional and/or circuit blocks within a given latency, then the packet switch controller 502 need not seize the packet switch 504. Rather, a design assumption may be made that the merge synchronization signal 132 will be received by the destination functional and/or circuit blocks (such as the graphics processors 104) within an acceptable tolerance. Alternately, the core merge unit 106N could transmit the merge synchronization signal 132 to the respective graphics processors 104 by way of the control data bus 404 and the local merge units 106A–D.

Figure 18:
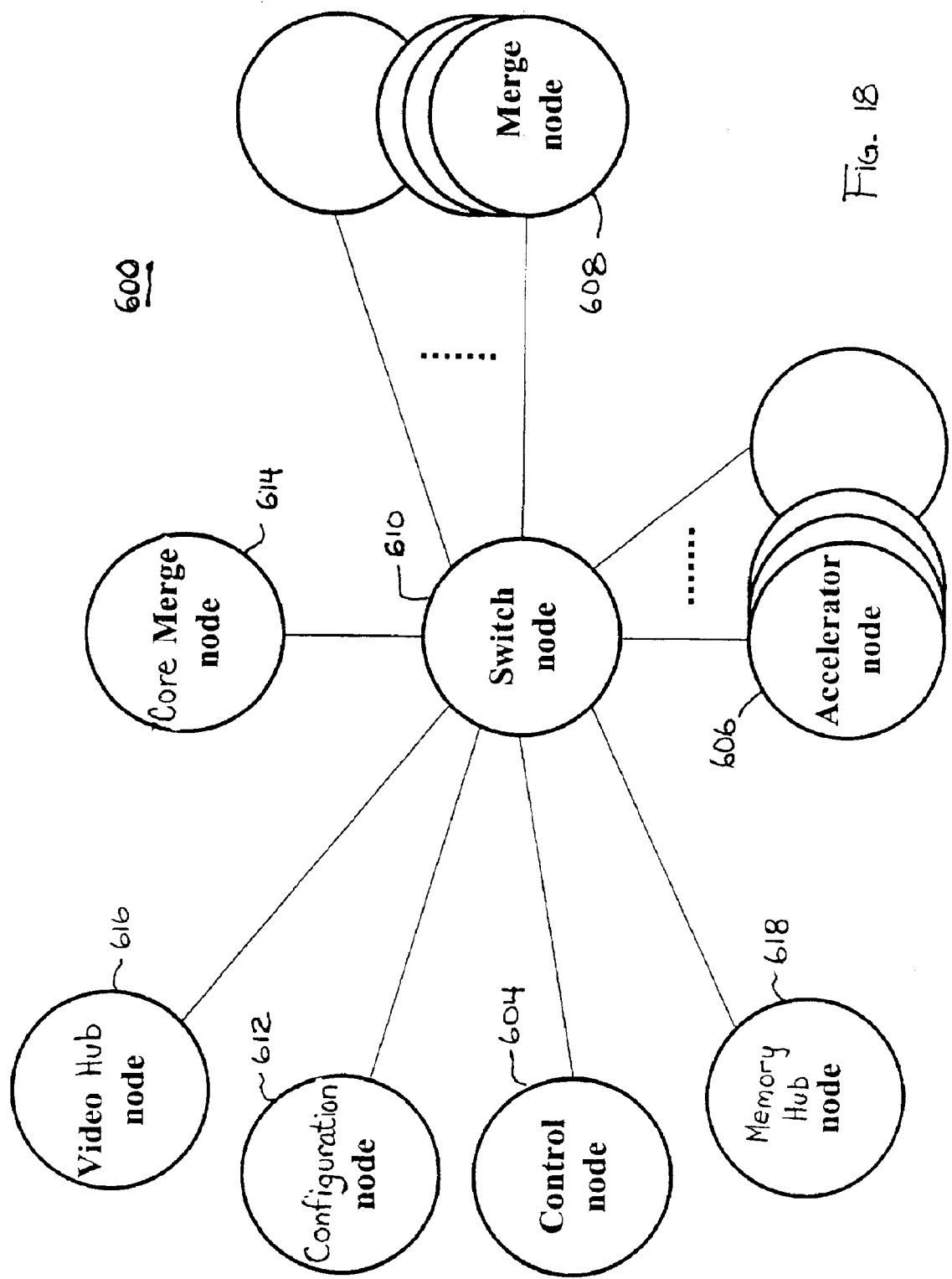
FIG. 18 is a system for processing image data in accordance with one or more further aspects of the present invention.

Reference is now made to FIG. 18, which is block diagram of an apparatus 600 for processing image data to produce an image on a display in accordance with one or more further aspects of the present invention. The apparatus 600 preferably includes a plurality of processing nodes 602, at least one of which is a control node 604, that are coupled together on a packet-switched network, such as a local area network (LAN). The packet-switched network (here a LAN) and an associated TCP layer is assumed to enjoy a data transmission rate (from source node to destination node) that is sufficiently high to support the synchronization schema discussed hereinabove to produce the image.

The control node 604 is preferably operable to select a subset of processing nodes from among the plurality of processing nodes 602 to participate in processing the image data to produce the image for display. The subset of processing nodes preferably includes at least one accelerator node 606, at least one merge node 608, at least one packet switch node 610, and at least one configuration node 612. The apparatus 600 may optionally include at least one core merge node 614, at least one video hub node 616, and at least one memory hub node 618.

The at least one accelerator node 606 preferably includes one or more of the graphics processors 104 discussed hereinabove with respect to at least FIGS. 3, 10, and 14–17. More particularly, the at least one accelerator node 606 preferably enjoys the functionality discussed hereinabove with respect to the one or more graphics processors 104, although a repeated detailed discussion of that functionality is omitted for purposes of simplicity. The at least one merge node 608 preferably includes at least one of the merge units 106 discussed hereinabove with respect to at least FIGS. 3, 10, and 14–17. Preferably, the at least one merge node 608 enjoys the functionality of the at least one merge node 106, although a repeated detailed description of that functionality is omitted for the purposes of simplicity. The control node 604 preferably includes the control processor 102 discussed hereinabove with respect to at least FIGS. 3, 10, and 14–17, although a detailed description of the control processor 102 is omitted for the purposes of simplicity. The packet switch node 610 is preferably operable to route the image data, frame image data, combined frame image data, any command instructions, and/or any other data among the plurality of processing nodes 602.

The plurality of processing nodes 602 represent resources that may be tapped to achieve the production of the image for display. As these resources are distributed over the package-switched network, it is desirable to engage in a process of selecting a subset of these resources to participate in the production of the image. Indeed, some of the resources may not be available to participate in producing the image, other resources may be available but may not have the requisite capabilities to participate in producing the image, etc.

Figure 19:
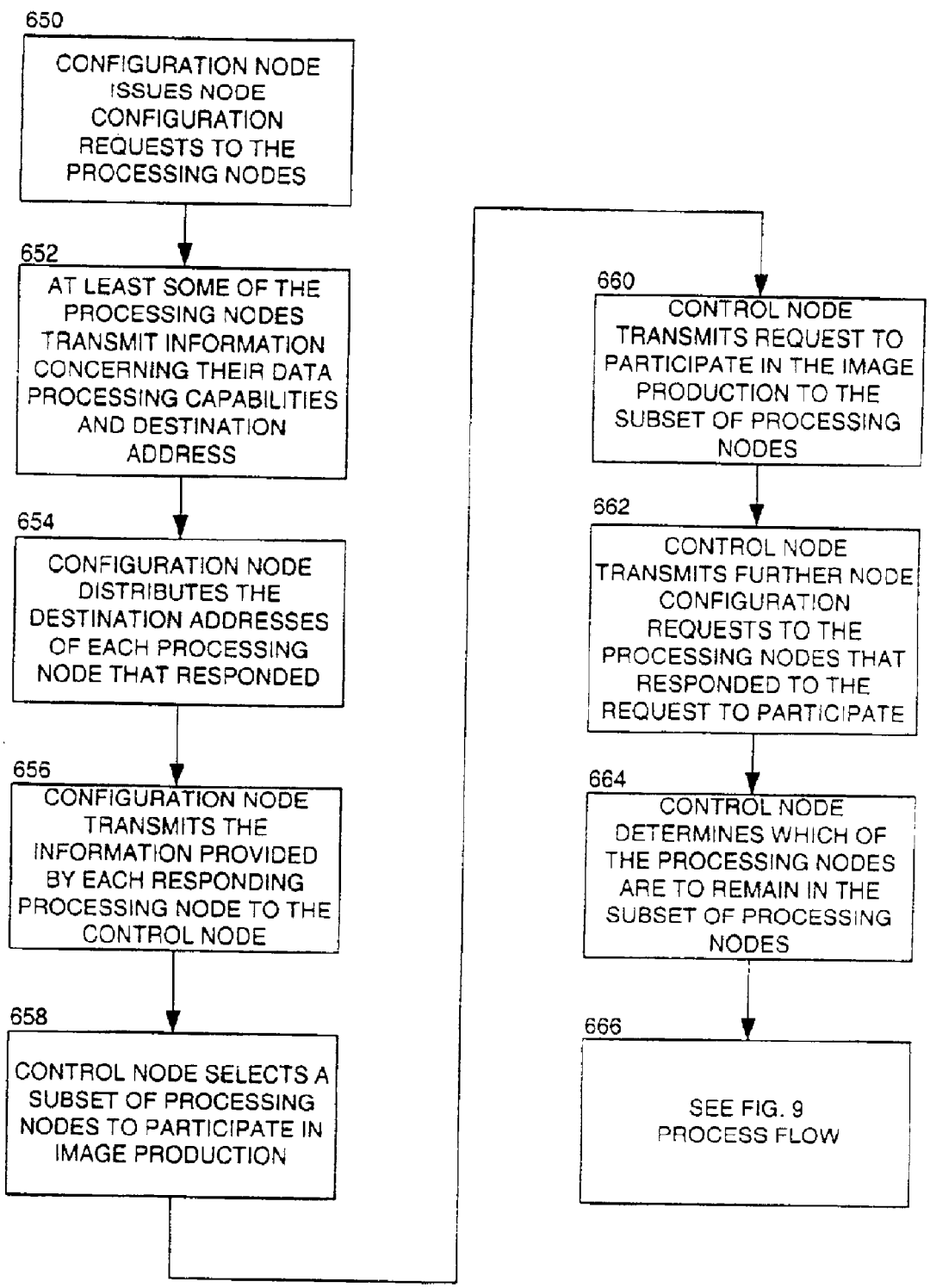
FIG. 19 is a process flow diagram suitable for use with the system of FIG. 18.

With reference to FIGS. 18 and 19, the configuration node 612 is preferably operable to issue one or more node configuration requests to the plurality of processing nodes 602 over the packet-switched network (action 650). These node configuration requests preferably prompt the processing nodes 602 to transmit at least some information concerning their data processing capabilities, their availability, their destination address, etc. More particularly, the information sought in terms of their data processing capability includes at least one of (i) a rate at which the image data can be processed into frame image data (e.g., a capability of a graphics processor 104), (ii) a number of frame buffers available (e.g., a capability of a graphics processor 104), (iii) frame image data resolution (e.g., a capability of a graphics processor 104), (iv) an indication of respective modes of operation supported by the graphics processors of a given node, (v) a number of parallel paths into which respective frame image data may be input for merging into the combined frame image data (e.g., a capability of a merge node 608), (vi) an indication of respective modes of operation supported by a merge unit, (vii) memory size available for storing data (e.g., a capability of a memory hub node 618), (viii) memory access speed (e.g., a capability of a memory hub node 618), and (ix) memory throughput (e.g., a capability of a memory hub node 618). It is understood that the above list is given by way of example only and may not be exhaustive.

At action 652, at least some of the processing nodes 602 preferably transmit information concerning their data processing capabilities, their destination addresses and their availability to the configuration node 612 over the packet-switched network. The configuration node 612 is preferably further operable to distribute the received destination addresses to each processing node that responded to the node configuration requests (action 654).

At action 656, the configuration node 612 is preferably operable to transmit the information provided by each processing node 602 in response to the node configuration requests to the control node 604. At action 658, the control node is preferably operable to select the subset of processing nodes from among the processing nodes 602 that responded to the node configuration requests to participate in processing the image data to produce the image for display. This selection process is preferably based on the responses from the processing nodes 602 to the node configuration requests. At action 660, the control node 604 is preferably operable to transmit a request to participate in processing the image data to each of the subset of processing nodes 602, thereby promptly them to accept participation. The control node 604 is preferably further operable to transmit one or more further node configuration requests to one or more of the subset of processing nodes 602 that responded to the request to participate (action 662). Preferably, the further node configuration request includes at least a request for the node to provide information concerning a format in which the node expects to transmit and receive data, such as the image data, the frame image data, combined frame image data, processing instructions, etc.

At action 664, the control node is preferably operable to determine which of the processing nodes 602 are to be retained in the subset of processing nodes to participate in processing the image data. This determination is preferably based on at least one of the data processing capabilities, format information, availability, etc. provided by the processing nodes 602 in response to the node configuration requests. At action 660, the apparatus 600 preferably operates in substantial accordance with the process flow discussed hereinabove with respect to FIG. 9, particularly in terms of the use of the merge synchronization signal to synchronize the release of frame image data and combined frame image data to the one or more merge units 106 of the at least one merge node 608, it being understood that the flow of data between the graphics processors 104, merge units 106, control processor 102, synchronization units 108, etc. are facilitated over the packet-switched network. Moreover, the apparatus 600 of FIG. 18 is preferably operable to provide the requisite resources to implement any of the previously discussed apparatuses hereinabove, for example, apparatus 100 of FIG. 3, apparatus 200 of FIG. 10, apparatus 350 of FIG. 14, apparatus 360 of FIG. 15, apparatus 400 of FIG. 16, apparatus 500 of FIG. 17, or any combination thereof.

Advantageously, the apparatus 600 of FIG. 18 is easily modified to include substantially those resources necessary to achieve the desired quality of the image for display. Indeed, as accelerator 606, merge nodes 608, core merge nodes 614, video hub modes 616, memory hub nodes 618, etc. may be readily added or removed from the subset of processing nodes 602 participating in the production of the image, a desirable quantum of processing power may be achieved on a case-by-case basis, no matter what level of processing power is required.

Figure 20:
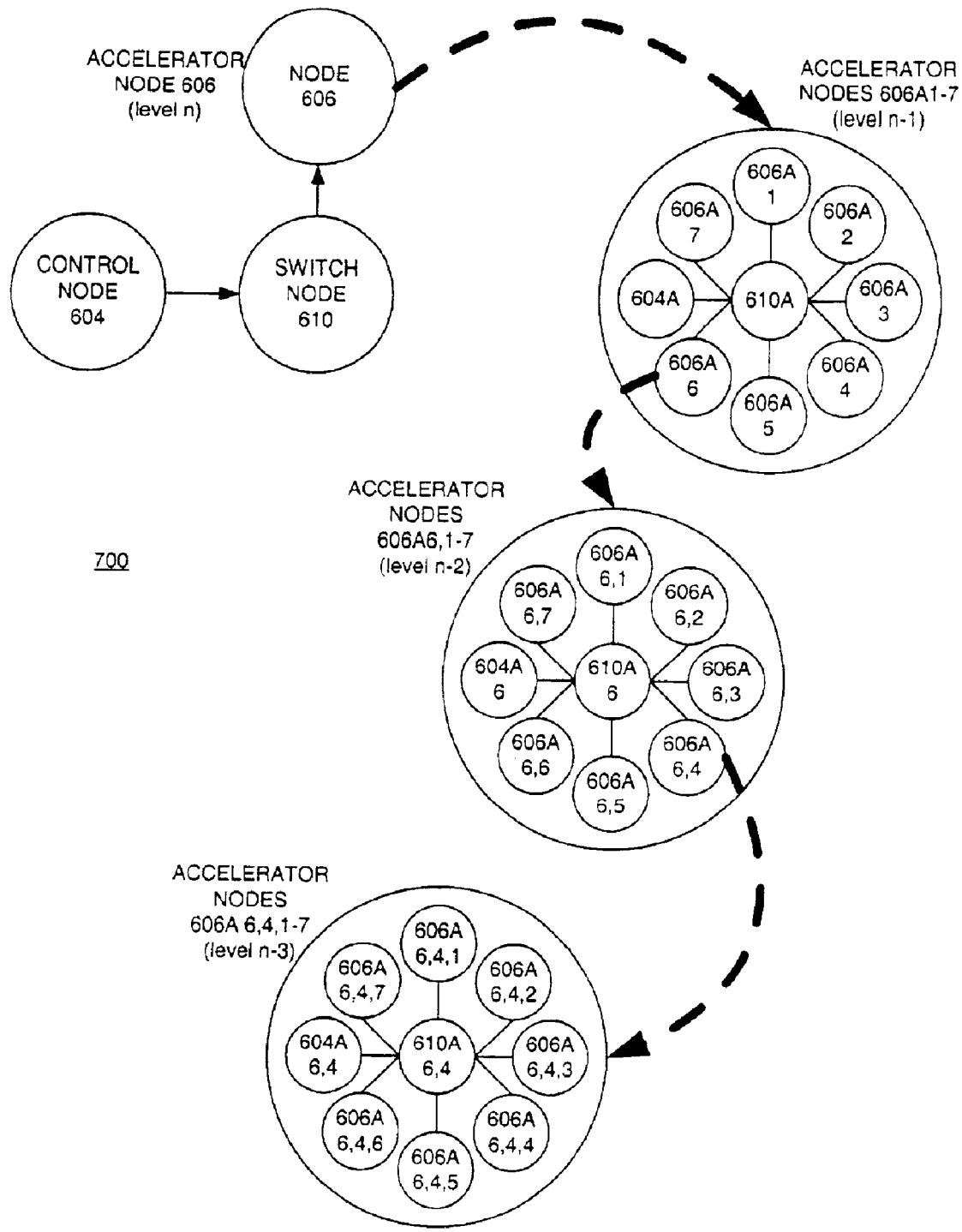
FIG. 20 is a block diagram of an apparatus for processing image data in accordance with one or more further aspects of the present invention.

Reference is now made to FIG. 20, which is a block diagram of an apparatus 700 for processing image data to produce an image on a display. The apparatus 700 preferably includes substantially the same general configuration of processing nodes 602 as illustrated in FIG. 18. In particular, the apparatus 700 preferably includes the control node 604, the accelerator node 606, the merge node 608, the packet switch node 610, the configuration node 612 and optionally the core merge node 614, the video hub node 616, and the memory hub node 618 as shown in FIG. 18, where only certain of these nodes are shown in FIG. 20 for clarity. It is preferred that the apparatus 700 enjoys the functionality discussed hereinabove with respect to the apparatus 600 of FIG. 18 and the process flow of FIG. 19, although a repeated discussion concerning the details of these functions is omitted for the purposes of clarity.

It is preferred that the processing nodes of apparatus 700 are coupled together on an open packet-switched network, such as the Internet. The packet-switched network, preferably employs suitable hardware and a TCP layer that enjoys a data transmission rate (e.g., from source node to destination node) that is sufficiently high to support the synchronization schema discussed hereinabove to produce the image.

The apparatus 700 contemplates that the processing nodes are arranged in a hierarchy, where the one or more accelerator nodes 606 (only one such accelerator 606 being shown for simplicity) are coupled to the packet switch node 610 on an (n)th level. By extension, the control node 604, the merge nodes 608, 614 (not shown), the packet switch node 610, the configuration node 612 (not shown), the video hub node 616 (not shown), and the memory hub node 618 (not shown) are also on the (n)th level. At least one of the (n)th level accelerator nodes 606 preferably includes an (n−1)th level control node 604 and a plurality of (n−1)th level accelerator nodes 606 coupled together by way of an (n−1)th level packet switch node 610. As shown in FIG. 20, the (n)th level accelerator node 606 includes an (n−1)th level control node 604A, an (n−1)th level packet switch node 610A, and seven (n−1)th level accelerator nodes 606A1–7. Preferably, the (n)th level accelerator node 606 performs substantially the same functions in the aggregate as discussed hereinabove with respect to the at least one accelerator node 606 of FIG. 18, although it is contemplated that the (n)th level accelerator node 606 would enjoy a higher level of processing power inasmuch as it includes seven accelerator nodes 606A1–7, each including one or more graphics processors 104. Moreover, each of the (n−1)th level accelerator nodes 606A1–7 preferably enjoy the functionality of the accelerator nodes 606 discussed hereinabove with respect to FIG. 18 inasmuch as each one preferably includes one or more graphics processors 104, etc. Although seven (n−1)th level accelerator nodes 606A1–7 are illustrated, any number of such (n−1)th level accelerator nodes may be employed without departing from the scope of the invention.

Preferably, one or more of the (n−1)th level accelerator nodes 606A1–7, such as (n−1)th level accelerator node 606A6, includes an (n−2)th level control node 604A6 and a plurality of (n−2)th level accelerator nodes 606A6,1–m (where m may be any number, such as seven) coupled together by way of an (n−2)th level packet switch node 610A6. The (n−2)th level accelerator nodes 606A6,1–m enjoy the functionality discussed hereinabove with respect to the accelerator nodes 606 of FIG. 18. In accordance with the invention, the number of levels, n, may be any integer number.

Preferably, one or more of the (n−2)th level accelerator nodes 606A6,1–m, such as (n−2)th level accelerator node 606A6,4, includes an (n−3)th level control node 604A6,4 and a plurality of (n−3)th level accelerator nodes 606A6,4, 1–m (where the number may be any number, such as seven) coupled together by way of an (n−3)th level packet switch node 610A6,4. The (n−3)th level accelerator nodes 606A6, 4,1–m enjoy the functionality discussed hereinabove with respect to the accelerator nodes 606 of FIG. 18. In accordance with the invention, the number of levels, n, may be any integer number.

As was the case with the apparatus 600 of FIG. 18, the control nodes 604 are preferably operable to select a subset of processing nodes from among the plurality of processing nodes 602 to participate in processing the image data to produce the image for display (see discussion of FIG. 19 above). With the apparatus 700 of FIG. 20, the selection process results in a subset of processing nodes 602 that may include n levels.

Figure 21A:
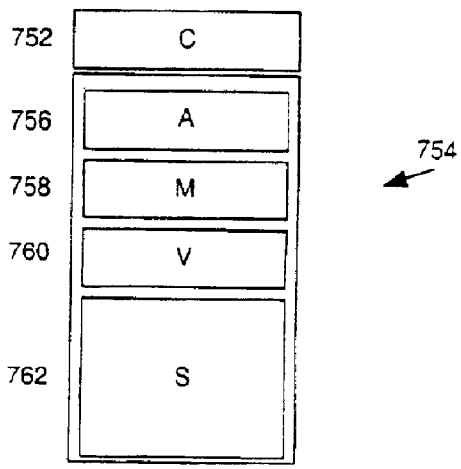
FIGS. 21A–21B are block diagrams of instruction formats that may be employed by the apparatus of FIG. 20.

With reference to FIGS. 20 and 21A, once the selection of the subset of processing nodes 602 has been completed, the (n)th level control node 604 is preferably operable to transmit one or more (n)th level information sets 750 over the packet-switched network to one or more of the subset of processing nodes 602. The information sets 750 preferably include at least one of instructions and data used in the production of the image. For example, the instructions preferably include information concerning the one or more modes of operation in which the graphics processors 104, local merge units 106, core merge unit 108, etc. are to operate, preferably on a frame-by-frame basis as discussed hereinabove. The data may include texture data, video data (such as externally provided frames of image data to be combined to produce the final image), etc.

Each of the (n)th level information sets 750 preferably includes an (n)th level header 752 indicating at least that the given information set was issued from the (n)th level control nodes 604. The header 752 may also identify the information set as including instruction information, data, or a combination of both. The (n)th level information sets 750 also preferably include a plurality of (n)th level blocks 754, each block including information and/or data for one or more of the (n)th level nodes, such as an (n)th level accelerator node 756, an (n)th level merge node 758, an (n)th level video hub node 760, an (n)th level memory hub node 762, etc. The (n)th level switch node 610 is preferably operable to dissect the instructions set 750 such that the respective (n)th level information blocks 756–762 are routed to the respective (n)th level nodes.

Figure 21B:
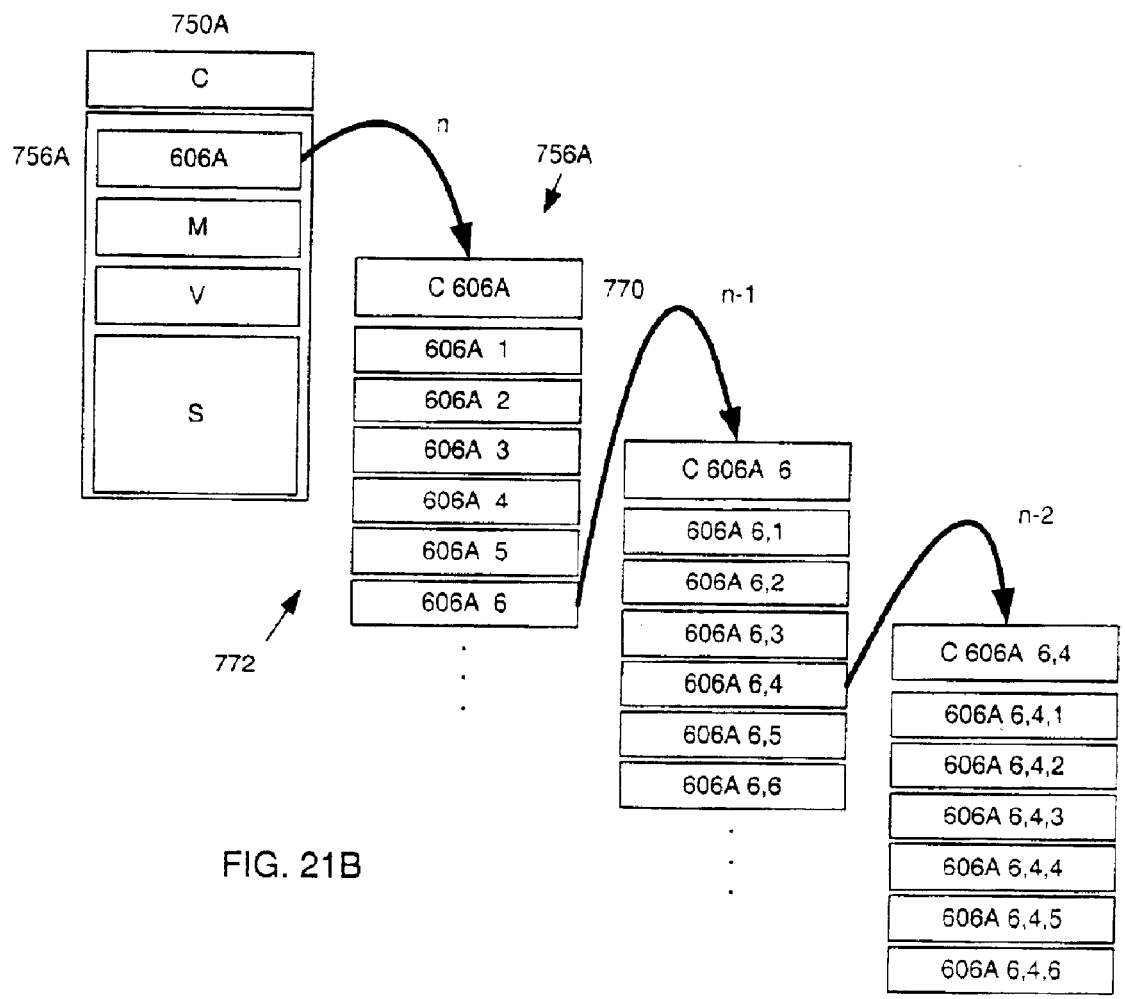

With reference to FIG. 21B, one or more of the (n)th level information sets 750, such as information set 750A, may include an (n)th level information block for an (n)th level accelerator node, such as (n)th level information block 606A, that includes a plurality of (n−1)th level information sub-blocks 606A1–m. The (n)th level information block 756A also preferably includes a header 770 that indicates whether the information sub-blocks 772 contain instructions, data, etc.

Referring also to FIG. 20, the (n)th level switch node 610 is preferably operable to receive the information set 750A, dissect the (n)th level information block 756A for the (n)th level accelerator node 606 therefrom, and transmit the (n)th level information block 756A to the (n−1)th level control node 604A. The (n−1)th level control node 604A is preferably operable to transmit the respective (n−1)th information sub-blocks 772 of the (n)th level information block 756A to the (n−1)th level packet switch node 610A such that the respective (n−1)th level information sub-blocks 772 may be transmitted to the respective (n−1)th level accelerator nodes 606A1−m. This functionality and process is preferably repeated for each level of accelerator nodes.

The apparatus 700 is preferably operable to provide the requisite resources to implement any of the previously discussed apparatuses hereinabove. For example, apparatus 100 of FIG. 3, apparatus 200 of FIG. 10, apparatus 350 of FIG. 14, apparatus 360 of FIG. 15, apparatus 400 of FIG. 16, apparatus 500 of FIG. 17, apparatus 600 of FIG. 18, or any combination thereof.

Advantageously, the apparatus 700 of FIG. 20 is easily modified to include substantially those resources necessary to achieve the desired quality of the image for display. Indeed, as the number and level of processing nodes may be readily increased or decreased, a desirable quantum of processing power may be achieved on a case-by-case basis, no matter what level of processing power is required.

In accordance with at least one further aspect of the present invention, a method of processing image data to produce an image for display on a display screen may be achieved utilizing suitable hardware, such as that illustrated in FIGS. 3, 8, 10–18 and 20, and/or utilizing a manual or automatic process. An automatic process may be implemented utilizing any of the known processors that are operable to execute instructions of a software program. The software program preferably causes the processor (and/or any peripheral systems) to execute certain steps in accordance with one or more aspects of the present invention. In a manual process, the steps themselves would be performed using manual techniques. In either case, the steps and/or actions of the method preferably correspond with the functions discussed hereinabove with respect to at least portions of the hardware of FIGS. 3, 8, 10–18 and 20.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus for processing image data to produce an image for covering an image area, comprising:
    a plurality of graphics processors, each graphics processor being operable to render the image data into frame image data and to store the frame image data in a respective local frame buffer;
    a control processor operable to provide instructions to the plurality of graphics processors;
    one or more merge units operable to synchronously receive the frame image data from the respective local frame buffers and to synchronously produce combined frame image data based thereon, wherein at least one of the one or more merge units is operable to produce a merge synchronization signal used by the graphics processors to release the frame image data from the respective local frame buffers to the one or more merge units;
    means for transmitting the entire combined frame image data to a single display;
    wherein the single display displays the entire combined frame image data on its image area;
    at least one synchronization unit operable to receive the merge synchronization signal from the at least one merge unit; and
    respective local synchronization units coupled to the graphics processors and operable to receive the merge synchronization signal and to cause the release of the frame image signal from the local frame buffer to the at least one merge unit.

2. An apparatus for processing image data to produce an image for covering an image area, comprising:
    a plurality of graphics processors, each graphics processor being operable to render the image data into frame image data and to store the frame image data in a respective local frame buffer;
    a control processor operable to provide instructions to the plurality of graphics processors;
    one or more merge units operable to synchronously receive the frame image data from the respective local frame buffers and to synchronously produce combined frame image data based thereon, wherein at least one of the one or more merge units is operable to produce a merge synchronization signal used by the graphics processors to release the frame image data from the respective local frame buffers to the one or more merge units, wherein the merge synchronization signal is synchronized in accordance with a display protocol defining how respective frames of the combined frame image data are to be displayed, wherein the display protocol defines at least one of a frame rate at which successive frames of the combined frame image data are displayed, and a blanking period that dictates when the combined frame image data is to be refreshed and wherein the merge synchronization signal includes transitions that are proximate to ends of the blanking periods such that the at least one merge unit initiates producing the combined frame image data for display at the end of at least one of the blanking periods; and
    means for transmitting the entire combined frame image data to a single display;
    wherein the single display displays the entire combined frame image data on its image area.

3. The apparatus of claim 2, wherein the transitions of the merge synchronization signal are substantially coincident with the ends of the blanking periods.

4. The apparatus of claim 2, wherein the merge synchronization signal includes transitions that lead the ends of the blanking periods.

5. An apparatus for processing image data to produce an image for covering an image area, comprising:
    a plurality of graphics processors, each graphics processor being operable to render the image data into frame image data and to store the frame image data in a respective local frame buffer;
    a control processor operable to provide instructions to the plurality of graphics processors;

one or more merge units operable to synchronously receive the frame image data from the respective local frame buffers and to synchronously produce combined frame image data based thereon, wherein at least one of the one or more merge units is operable to produce a merge synchronization signal used by the graphics processors to release the frame image data from the respective local frame buffers to the one or more merge units; and means for transmitting the entire combined frame image data to a single display;

wherein the single display displays the entire combined frame image data on its image area;

the plurality of graphics processors are grouped into respective sets of graphics processors;

the one or more merge units include a respective local merge unit coupled to each set of graphics processors, and a core merge unit coupled to each local merge unit;

the respective local merge units are operable to synchronously receive the frame image data from the respective local frame buffers and to synchronously produce local combined frame image data based thereon; and the core merge unit is operable to synchronously receive the local combined frame image data from the respective local merge units and to synchronously produce the combined frame image data based thereon.

6. The apparatus of claim 5, further comprising:

a respective local synchronization unit coupled to each set of graphics processors and to each local merge unit; and a core synchronization unit coupled each local synchronization unit and to the core merge unit, wherein the core merge unit is operable to produce the merge synchronization signal used by the core synchronization unit and at least some of the local synchronization units to permit the respective sets of graphics processors to synchronously release the frame image data from the respective local frame buffers to the respective local merge units, and to permit the respective local merge units to synchronously release the local combined frame image data to the core merge unit.

7. The apparatus of claim 5, wherein the control processor is operable to instruct the graphics processors and the one or more merge units to operate in one or more modes that affect at least one of (i) timing relationships between when image data are rendered, when frame image data are released from respective local frame buffers, and when frame image data are merged; and (ii) how the frame image data are merged to synchronously produce the combined frame image data.

8. A method for processing image data to produce an image for covering an image area, comprising:

rendering the image data into frame image data using a plurality of graphics processors;

storing the frame image data in respective local frame buffers;

synchronously merging the frame image data from the respective local frame buffers to synchronously produce combined frame image data based thereon;

transmitting the entire combined frame image data to a single display;

displaying the entire combined frame image data on the image area of the single display; and producing a merge synchronization signal used by at least some of the plurality of graphics processors to synchronously release the frame image data from the respective local frame buffers for merging, wherein the merge synchronization signal is synchronized in accordance with a display protocol defining how respective frames of the combined frame image data are to be displayed, wherein the display protocol defines at least one of a frame rate at which successive frames of the combined frame image data are displayed, and a blanking period that dictates when the combined frame image data is to be refreshed, and wherein the merge synchronization signal includes transitions that are proximate to ends of the blanking periods such that the combined frame image data are available for display at the end of at least one of the blanking periods, and wherein the transitions of the merge synchronization signal are substantially coincident with the ends of the blanking periods.

9. The method of claim 8, wherein the transitions of the merge synchronization signal are substantially coincident with the ends of the blanking periods.

10. The method of claim 8, wherein the merge synchronization signal includes transitions that lead the ends of the blanking periods.

11. A method for processing image data to produce an image for covering an image area, comprising:

rendering the image data into frame image data using a plurality of graphics processors;

storing the frame image data in respective local frame buffers;

synchronously merging the frame image data from the respective local frame buffers to synchronously produce combined frame image data based thereon;

transmitting the entire combined frame image data to a single display; and displaying the entire combined frame image data on the image area of the single display, wherein the graphics processors can operate in one or more modes that affect at least one of (i) timing relationships between when image data are rendered, when frame image data are released from respective local frame buffers, and when frame image data are merged; and (ii) how the frame image data are merged to synchronously produce the combined frame image data, and wherein at least one of the modes provides that:

one or more of the graphics processors completes rendering the image data into the respective frame buffers prior to the end of each blanking period;

one or more of the graphics processors completes rendering the image data into the respective frame buffers prior to the end of an integral number of blanking periods; and one or more of the graphics processors includes an integral number of local frame buffers and that the one or more graphics processors completes rendering the image data into the respective integral number of frame buffers prior to the ends of a corresponding integral number of blanking periods.

12. A method for processing image data to produce an image for covering an image area, comprising:

rendering the image data into frame image data using a plurality of graphics processors;

storing the frame image data in respective local frame buffers;

synchronously merging the frame image data from the respective local frame buffers to synchronously produce combined frame image data based thereon;

transmitting the entire combined frame image data to a single display; and displaying the entire combined frame image data on the image area of the single display, wherein the graphics processors can operate in one or more modes that affect at least one of (i) timing relationships between when image data are rendered, when frame image data are released from respective local frame buffers, and when frame image data are merged; and (ii) how the frame image data are merged to synchronously produce the combined frame image data, and wherein at least one of the modes is a flip animation mode providing that: (i) the local frame buffers of at least two graphics processors include frame image data that are capable of covering the image area; and (ii) the method further comprises producing the combined frame image data by sequentially releasing the respective frame image data from the at least two graphics processors.

13. The method of claim 12, wherein the flip animation mode further provides that the at least two graphics processors complete rendering the image data into the respective frame buffers prior to the ends of an integral number of blanking periods.

14. The method of claim 13, wherein the integral number of blanking periods corresponds to the number of graphics processors participating in the flip animation mode.

15. The method of claim 13, wherein the integral number of blanking periods corresponds to the number of local frame buffers participating in the flip animation mode.

16. A method for processing image data to produce an image for covering an image area, comprising:

rendering the image data into frame image data using a plurality of graphics processors;

storing the frame image data in respective local frame buffers;

synchronously merging the frame image data from the respective local frame buffers to synchronously produce combined frame image data based thereon;

transmitting the entire combined frame image data to a single display;

displaying the entire combined frame image data on the image area of the single display;

wherein the graphics processors can operate in one or more modes that affect at least one of (i) timing relationships between when image data are rendered, when frame image data are released from respective local frame buffers, and when frame image data are merged; and (ii) how the frame image data are merged to synchronously produce the combined frame image data;

receiving at least one of a frame of the combined frame image data and at least one externally provided frame of frame image data;

transmitting the at least one of a frame of the combined frame image data and the at least one externally provided frame of frame image data to at least one of the plurality of graphics processors such that (i) at least one of the successive frames of frame image data from one or more of the graphics processors may include at least one of the at least one externally provided frame of frame image data and the frame of the combined frame image data; and producing a successive frame of the combined frame image data based on the at least one of the at least one externally provided frame of frame image data and the frame of the combined frame image data.

\* \* \* \* \*

UNITED STATES PATENT AND TRADEMARK OFFICE
CERTIFICATE OF CORRECTION

PATENT NO. : 6,924,807 B2
DATED : August 2, 2005
INVENTOR(S) : Hitoshi Ebihara et al.

It is certified that error appears in the above-identified patent and that said Letters Patent is hereby corrected as shown below:

Column 1,
Line 39, "affects" should read -- affect --.

Column 2,
Line 11, "are" should read -- is --.

Column 3,
Line 22, "screen," should read -- screen --.

Column 5,
Line 5, "display," should read -- display --.
Line 14, "screen," should read -- screen --.

Column 7,
Line 25, "is" should read -- are --.
Line 32, "include" should read -- includes --.

Column 8,
Line 53, "example" should read -- example, --.

Column 12,
Line 62, after "area" insert -- are --.

UNITED STATES PATENT AND TRADEMARK OFFICE
CERTIFICATE OF CORRECTION

PATENT NO.   : 6,924,807 B2
DATED        : August 2, 2005
INVENTOR(S)  : Hitoshi Ebihara et al.

It is certified that error appears in the above-identified patent and that said Letters Patent is hereby corrected as shown below:

Column 23,
Line 9, "is" should read -- are --.

Column 27,
Line 15, "is" should read -- are --.

Column 29,
Line 31, after "coupled" insert -- to --.

Signed and Sealed this

Eighth Day of November, 2005

JON W. DUDAS
*Director of the United States Patent and Trademark Office*